US009609335B2

(12) United States Patent
Lim et al.

(10) Patent No.: US 9,609,335 B2
(45) Date of Patent: Mar. 28, 2017

(54) METHOD AND APPARATUS FOR ENCODING/DECODING IMAGE USING VARIABLE-SIZE MACROBLOCKS

(71) Applicant: SK TELECOM CO., LTD., Seoul (KR)

(72) Inventors: Jeongyeon Lim, Seongnam-si (KR); Joohee Moon, Seoul (KR); Yunglyul Lee, Seoul (KR); Haekwang Kim, Seoul (KR); Sunyeon Kim, Seoul (KR); Byeungwoo Jeon, Seongnam-si (KR); Jongki Han, Seoul (KR); Hyoungmee Park, Suwon-si (KR); Mincheol Park, Bucheon-si (KR); Dongwon Kim, Seoul (KR); Kibaek Kim, Seoul (KR); Juock Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/745,181

(22) Filed: Jun. 19, 2015

(65) Prior Publication Data
US 2015/0288972 A1    Oct. 8, 2015

Related U.S. Application Data

(63) Continuation of application No. 14/745,093, filed on Jun. 19, 2015, now Pat. No. 9,565,444, which is a
(Continued)

(30) Foreign Application Priority Data

Oct. 1, 2009  (KR) .................. 10-2009-0093982
Oct. 1, 2009  (KR) .................. 10-2009-0093987

(Continued)

(51) Int. Cl.
H04N 19/159    (2014.01)
H04N 19/176    (2014.01)
(Continued)

(52) U.S. Cl.
CPC ......... *H04N 19/159* (2014.11); *H04N 19/105* (2014.11); *H04N 19/107* (2014.11);
(Continued)

(58) Field of Classification Search
CPC .................................................. H04N 19/176
(Continued)

(56) References Cited

U.S. PATENT DOCUMENTS 6,320,909 B1 *  11/2001  Takabatake ............ H04N 19/61
                                                    375/240.25
7,336,720 B2    2/2008   Martemyanov et al.
(Continued)

FOREIGN PATENT DOCUMENTS

KR    1020070029450 A    3/2007
KR    1020070069073 A    7/2007
(Continued)

OTHER PUBLICATIONS

International Search Report mailed Jun. 15, 2011 for PCT/KR2010/006740.
(Continued)

*Primary Examiner* — William C Vaughn, Jr.
*Assistant Examiner* — Luis Perez Fuentes
(74) *Attorney, Agent, or Firm* — Hauptman Ham, LLP

(57) ABSTRACT

A video decoding apparatus for reconstructing residual signals of a current block to be decoded by using a tree structure, includes: a decoder to decode, from a bitstream, prediction type information on the current block to be decoded, and divide, by the tree structure, the current block into one or more subblocks of which information on residual
(Continued)

signals is to be reconstructed, by decoding, from the bitstream, a partition flag which indicates whether a block corresponding thereto is divided into blocks of a lower layer in the tree structure, wherein blocks which are not further divided are identified as the subblocks of which information on the residual signals is to be reconstructed; and a reconstructor to reconstruct information on residual signals of each of the subblocks from the bitstream.

9 Claims, 14 Drawing Sheets

Related U.S. Application Data continuation of application No. 13/499,406, filed as application No. PCT/KR2010/006740 on Oct. 1, 2010, now Pat. No. 9,549,190.

(30) Foreign Application Priority Data

Oct. 21, 2009 (KR) .................. 10-2009-0100443
Oct. 1, 2010 (KR) .................. 10-2010-0096035

(51) Int. Cl.
*H04N 19/119* (2014.01)
*H04N 19/15* (2014.01)
*H04N 19/107* (2014.01)
*H04N 19/463* (2014.01)
*H04N 19/105* (2014.01)
*H04N 19/61* (2014.01)
*H04N 19/96* (2014.01)
*H04N 19/172* (2014.01)

(52) U.S. Cl.
CPC .......... *H04N 19/119* (2014.11); *H04N 19/15* (2014.11); *H04N 19/176* (2014.11); *H04N 19/463* (2014.11); *H04N 19/61* (2014.11); *H04N 19/96* (2014.11); *H04N 19/172* (2014.11)

(58) Field of Classification Search
USPC ........................................ 375/240.02
See application file for complete search history.

(56) References Cited

U.S. PATENT DOCUMENTS

| | | | |
|---|---|---|---|
| 8,432,970 B1* | 4/2013 | Cahalan | H04N 19/56 375/240.16 |
| 8,477,847 B2 | 7/2013 | Zhao et al. | |
| 8,503,527 B2* | 8/2013 | Chen | H04N 19/176 375/240.12 |
| 8,619,856 B2* | 12/2013 | Chen | H04N 19/176 375/240.12 |
| 8,817,877 B2* | 8/2014 | Jung | H04N 19/146 375/240.12 |
| 8,855,203 B2* | 10/2014 | Yamamoto | H04N 19/00072 375/240.12 |
| 8,885,727 B2* | 11/2014 | Lee | H04N 19/137 375/240.24 |
| 9,445,094 B2* | 9/2016 | Kobayashi | H04N 19/176 |
| 9,549,190 B2* | 1/2017 | Lim | H04N 19/159 |
| 2010/0086031 A1* | 4/2010 | Chen | H04N 19/176 375/240.12 |
| 2014/0192154 A1* | 7/2014 | Jeong | H04N 19/597 348/43 |
| 2015/0288987 A1* | 10/2015 | Lim | H04N 19/176 375/240.12 |

FOREIGN PATENT DOCUMENTS

| | | |
|---|---|---|
| KR | 1020070118560 A | 12/2007 |
| KR | 1020080034131 A | 4/2008 |

OTHER PUBLICATIONS

Jaeil Kim et al., "Enlarging MB size for high fidelity video coding beyond HD", IT-Telecommunications Standardization Sector, Study Group 16, Oct. 8-10, Jan. 22, 2014, 6 pages, San Diego, USA.

Jae-Chool Lee et al.,"Hierarchical Block Mode Structure Extension for Video Coding", Jan. 31, 2008, pp. 73-74, Samsung electronics.

* cited by examiner

M, N are Integers Equal to or Larger than 16

CIF Image Including 396 Macroblocks of Size 16 x 16

CIF Image Including 54 Macroblocks of Size 64 x 32

| Encoding Order | Layer Number | Partition Number | Partition Type |
|---|---|---|---|
| 1 | 0 | 0 | 3 |
| 2 | 1 | 0 | 3 |
| 3 | 2 | 0 | 3 |
| 4 | 3 | 0 | 3 |
| 5 | 3 | 1 | 3 |
| 6 | 3 | 2 | 0 |
| 7 | 3 | 3 | 0 |
| 8 | 2 | 1 | 0 |
| 9 | 2 | 2 | 0 |
| 10 | 2 | 3 | 1 |
| 11 | 1 | 1 | 2 |
| 12 | 1 | 2 | 1 |
| 13 | 1 | 3 | 3 |
| 14 | 2 | 0 | 0 |
| 15 | 2 | 1 | 0 |
| 16 | 2 | 2 | 0 |
| 17 | 2 | 3 | 0 |

*FIG. 16*

METHOD AND APPARATUS FOR ENCODING/DECODING IMAGE USING VARIABLE-SIZE MACROBLOCKS

CROSS-REFERENCE TO RELATED APPLICATIONS

The present application is a continuation of U.S. patent application Ser. No. 14/745,093 filed Jun. 19, 2015, which is a continuation of U.S. patent application Ser. No. 13/499,406 filed Aug. 1, 2012, which is a the National Phase application of International Application No. PCT/KR2010/006740, filed Oct. 1, 2010, which is based upon and claims the benefit of priorities from Korean Patent Application No. 10-2009-0093982, filed on Oct. 1, 2009, Korean Patent Application No. 10-2009-0093987, filed on Oct. 1, 2009, Korean Patent Application No. 10-2009-0100443, filed on Oct. 21, 2009, and Korean Patent Application No. 10-2010-0096035, filed on Oct. 1, 2010. The disclosures of the above-listed applications are hereby incorporated by reference herein in their entirety.

TECHNICAL FIELD

The present disclosure relates to an apparatus and a method for encoding and/or decoding an image by encoding and decoding subblocks within a variable sized macroblock or a prediction basic unit based on various prediction modes.

BACKGROUND

The statements in this section merely provide background information related to the present disclosure and do not constitute prior art.

Technologies for compressing video data include H.261, H.263, H.264, MPEG-2, MPEG-4, and so on. According to such video compression standards, each image is split and encoded into fixedly sized macroblocks formed of rectangular areas having pixels sized 16×16 of luma component and pixels sized 8×8 of chroma component. All luma components and all chroma components of each macroblock are spatially or temporally predicted, and then a predicted residual undergoes a transform, a quantization, and an entropy coding and finally a transmission. The most recently enacted H.264/AVC standard prescribes an encoding apparatus to use a 16×16 pixel block for the fixed macroblock size and subdivide each macroblock into smaller blocks for which an intra prediction or an inter prediction is carried out. In carrying out the intra predictive encoding, each macroblock may be split into 16×16, 8×8, or 4×4 pixel sizes, and the block of pixel size 16×16 is intra-predicted in one of four prediction modes, 8×8 and 4×4 blocks are intra-predicted in one of nine prediction modes. In the case of inter prediction, the macroblock may be subsplit into blocks of pixel sizes 16×16, 16×8, 8×16, 8×8, 8×4, 4×8, or 4×4, and then used for the inter prediction through a motion compensation. The transform is performed by unit of 8×8 or 4×4 pixel sized blocks, and the quantization used for the transform coefficients is scalar quantization.

However, the inventor(s) has noted that the 16×16 macroblock is considered appropriate for small images by the class of the known QCIF (Quarter Common Intermediate Format) and CIF (Common Intermediate Format) and it is not the right macroblock size for compressing a high resolution image such as a 4K×2K image. In addition, the inventor(s) has noted that since typical video compression technology uses a fixedly sized macroblock in encoding an image (even though H.264/AVC subdivides and encodes macroblock into smaller block units, the macroblock is of a fixed size), encoding the high resolution image hardly achieves a sufficient encoding efficiency.

SUMMARY

In accordance with some embodiments of the present disclosure, a video decoding apparatus for reconstructing residual signals of a current block to be decoded by using a tree structure comprises a decoder and a reconstructor. The decoder is configured to decode, from a bitstream, prediction type information on the current block to be decoded, and divide, by the tree structure, the current block into one or more subblocks of which information on residual signals is to be reconstructed, by decoding, from the bitstream, a partition flag which indicates whether a block corresponding thereto is divided into blocks of a lower layer in the tree structure, wherein blocks which are not further divided are identified as the subblocks of which information on the residual signals is to be reconstructed. And the reconstructor is configured to reconstruct information on residual signals of each of the subblocks from the bitstream. Herein, when a block of a first layer is divided into a plurality of blocks of a second layer which is a lower layer of the first layer, the decoder is configured to decode the partition flag for each of the blocks of the second layer in a predetermined order. And, when a block among the blocks of the second layer is divided into a plurality of blocks of a third layer which is a lower layer of the second layer, the decoder is configured to decode the partition flag for each of the blocks of the third layer before decoding the partition flag for a next block of the second layer in the predetermined order.

DESCRIPTION OF DRAWINGS

FIG. 16 is an exemplary diagram for illustrating processes in which information indicating macroblock partition types for each layer is sequentially encoded according to a subblock order.

DETAILED DESCRIPTION

Figure 1:
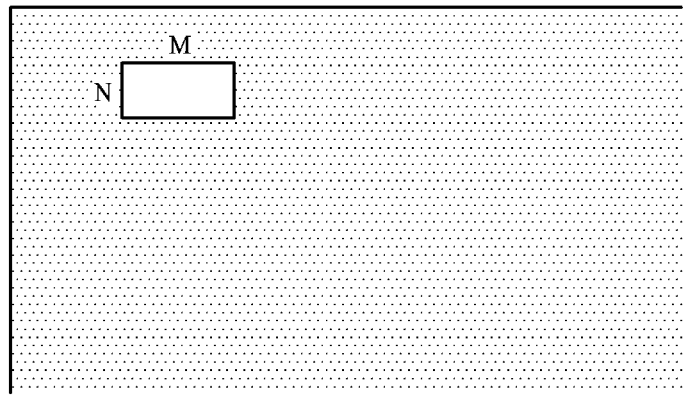
FIGS. 1 to 3 are exemplary diagrams for illustrating macroblocks by unit of M×N pixels according to an embodiment of the present disclosure.

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A video encoding apparatus and a video decoding apparatus, which will be discussed in the following description, may be a Personal Computer (PC), a notebook computer, a Personal Digital Assistant (PDA), a Portable Multimedia Player (PMP), a PlayStation Portable (PSP), and a mobile communication terminal, and refer to various apparatuses including a communication apparatus such as a communication modem for performing communication with various devices or a wired/wireless communication network, a memory for storing various programs and data for encoding or decoding a video, and a microprocessor for executing a program to perform an operation and a control.

Further, a video encoded into a bitstream by a video encoding apparatus is transmitted to a video decoding apparatus through a wired/wireless communication network such as an internet, a near field communication network, a wireless LAN (Local Area Network), a WiBro (Wireless Broadband) network, and a mobile communication network or through a communication interface such as a cable or a Universal Serial Bus (USB) in real-time or non-real time and decoded in the video decoding apparatus, and thus the decoded video may be reconstructed and reproduced as a video.

Some embodiments of the present disclosure provide a method for using various prediction modes for subblocks within a macroblock and a method of efficiently encoding and decoding prediction information of the macroblock by using the prediction basic unit.

Embodiment 1

An encoding and/or decoding method through a selection of an intra and/or inter mode by unit of subblocks within a macroblock Hereinafter, encoding and decoding apparatuses selectively using an inter prediction or an inter prediction for subblocks within a variable sized macroblock will be described with an example.

In a typical video compression technology, a predictive encoding and a predictive decoding for subblocks within one fixedly sized macroblock of an inter picture are performed using the same prediction method. That is, an inter predictive encoding or an intra predictive decoding is applied to all subblocks within one macroblock.

However, according to embodiments of the present disclosure, an image is encoded by using variable sized macroblocks, and respective subblocks within a macroblock can be encoded or decoded by selectively using an inter prediction or an intra prediction.

Alternatively, in the case of an intra picture, subblocks within a macroblock are encoded/decoded using only the intra prediction. Only in the case of an inter picture, subblocks within a macroblock can be encoded or decoded selectively by using the intra prediction or the inter prediction.

Alternatively, macroblock types are split into three types such as an intra macroblock, an inter macroblock, and an intra/inter macroblock, and the encoding or decoding may be applied to only the intra/inter macroblock type. That is, respective subblocks within the intra macroblock are all intra predictive-encoded, and respective subblocks within the inter macroblock are all inter predictive-encoded. Further, in the case of the intra/inter macroblock, respective subblocks within the macroblock may be encoded selectively using the inter prediction or the intra prediction. Only when respective subblocks within the macroblock are encoded selectively using the intra prediction or the inter prediction, information on whether an intra prediction mode or an inter prediction mode is used for each block is encoded.

A.1. Encoding Apparatus

A.1.1. Variable Sized Macroblock

Figure 2:
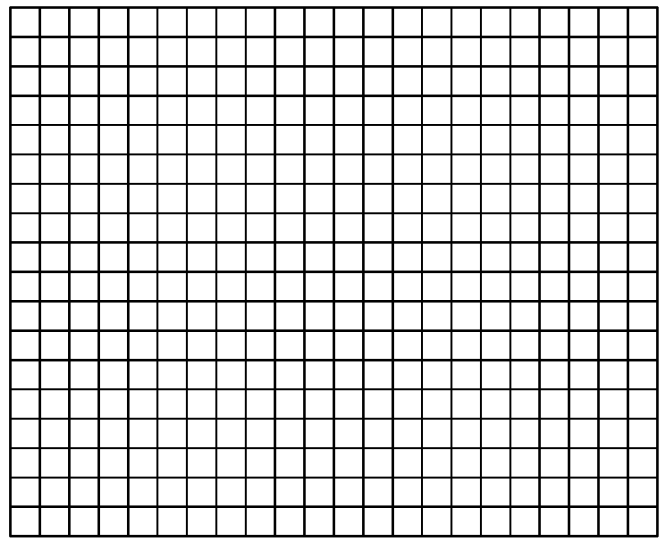
Figure 3:
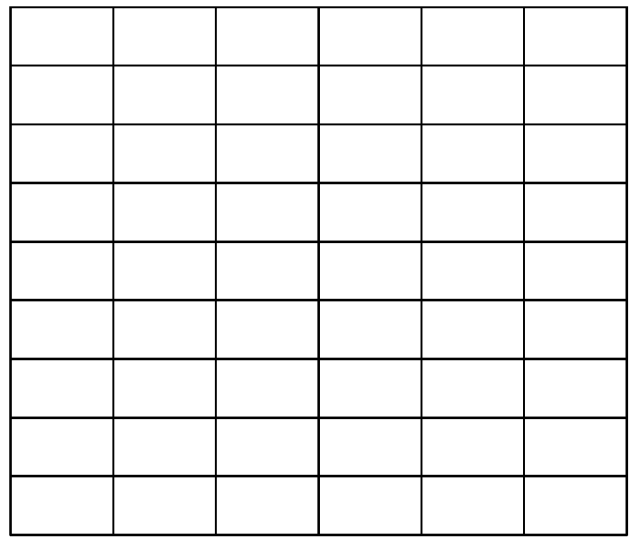

FIGS. 1 to 3 are exemplary diagrams for illustrating macroblocks by unit of M×N pixels according to an embodiment of the present disclosure.

FIG. 1 shows macroblocks by unit of M×N pixels (hereinafter, referred to as macroblocks of size M×N) expressed in a part of an input image having a certain size as an example, FIG. 2 shows a CIF image including 396 macroblocks of size 16×16 as an example, and FIG. 3 shows a CIF image including 54 macroblocks of size 64×32 as an example.

In the known video compression technology, an image is split into macroblocks of fixed size 16×16 and then encoded and decoded as shown in FIG. 2. However, in an embodiment of the present disclosure, the image may be encoded and decoded using macroblocks of size 64×32 (not only the size 64×32 but also size M×N (greater than a size 16×16) such as size 64×64 and size 32×64 are available) as shown in FIG. 3.

A.1.2. Example of Subblock Mode

Figure 4:
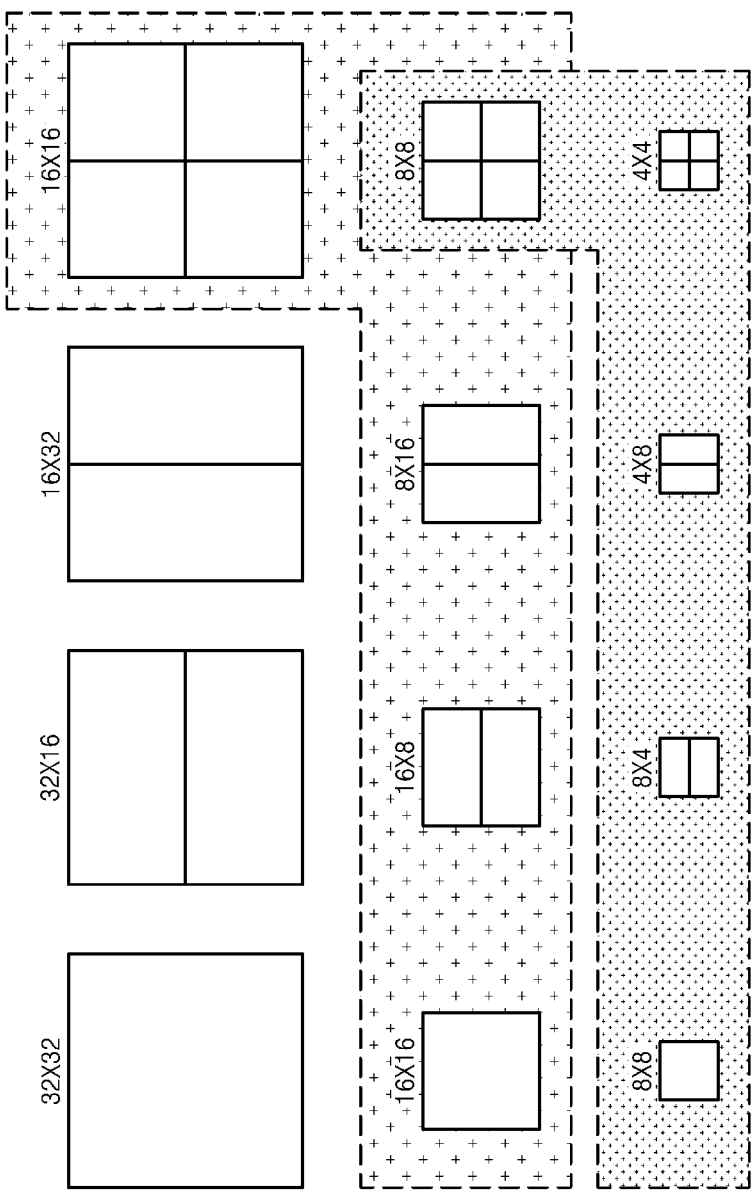
FIGS. 4 and 5 are exemplary diagrams for illustrating various subblock modes according to an embodiment of the present disclosure.
Figure 5:
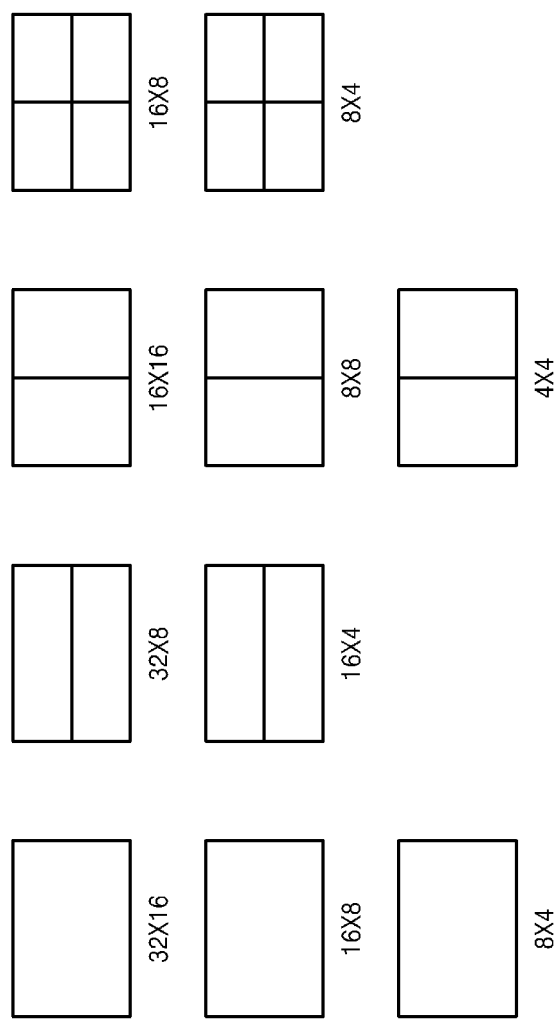

FIGS. 4 and 5 are exemplary diagrams for illustrating various subblocks according to an embodiment of the present disclosure.

FIG. 4 shows subblock modes available for a macroblock of size 32×32, and FIG. 5 shows subblock modes available for a macroblock of size 32×16.

According to an embodiment of the present disclosure, the macroblock of size M×N may be split into smaller blocks, that is, subblocks as shown in FIGS. 4 and 5. Macroblocks of the image may be intra predictive-encoded or inter predictive-encoded by unit of subblocks.

A.1.3. Encoder

Figure 6:
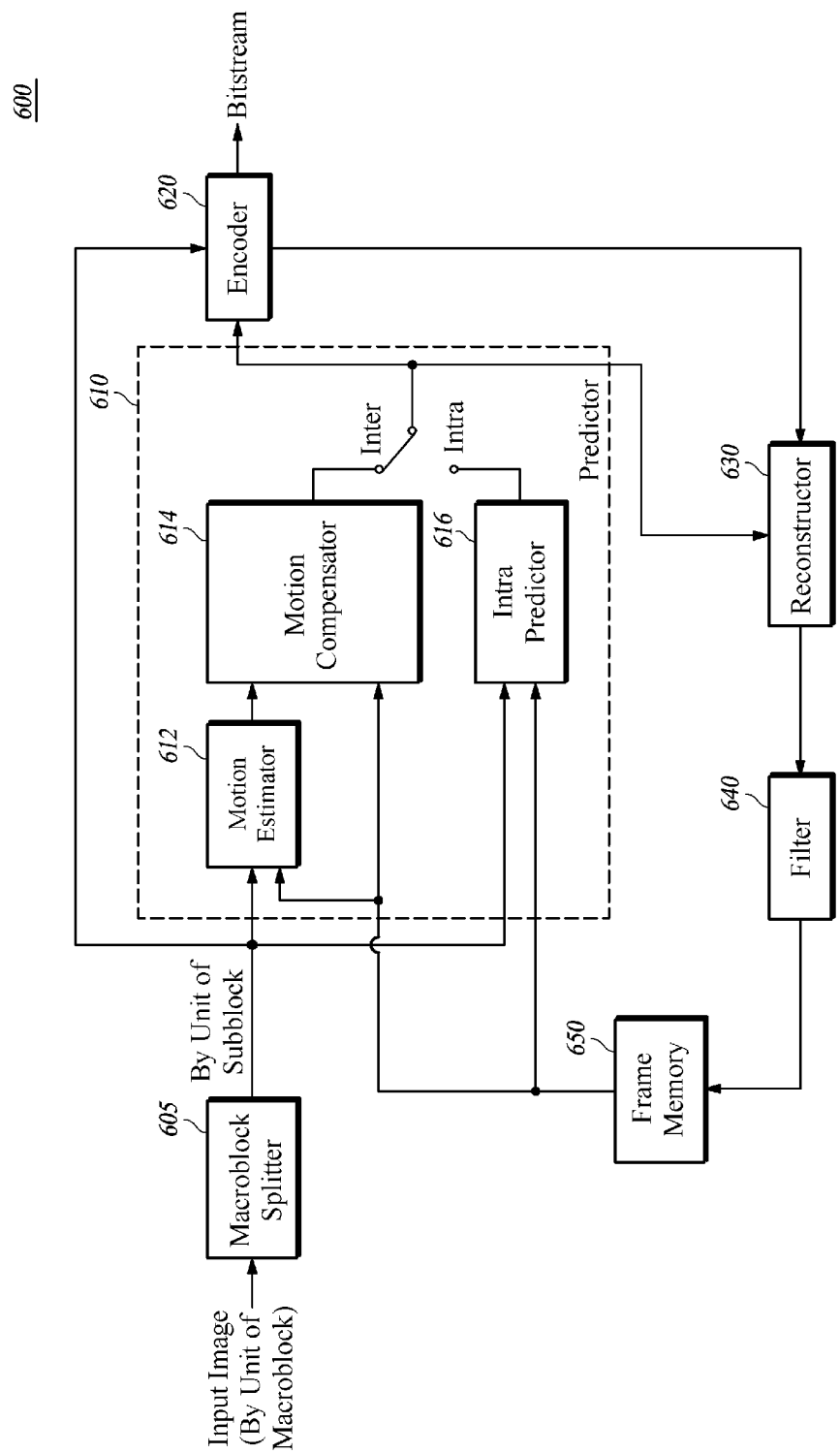
FIG. 6 is a schematic block diagram for illustrating a video encoding apparatus according to an embodiment of the present disclosure.

FIG. 6 is a schematic block diagram for illustrating a video encoding apparatus according to an embodiment of the present disclosure.

The video encoding apparatus according to the embodiment of the present disclosure corresponds to an apparatus for encoding an image by using macroblocks having a size equal to or larger than an arbitrary size, and may include a macroblock splitter 605, a predictor 610, an encoder 620, a reconstructor 630, a filter 640, and a frame memory 650. Here, the reconstructor 630, the filter 640, and the frame memory 650 may be omitted or included in another element selectively according to an implementation manner.

The macroblock splitter 605 splits a macroblock into one or more subblocks based on partition types shown in FIGS. 4 and 5 and generates partition information indicating sizes and shapes of subblocks within the macroblock. Each of the split subblocks is input to the predictor 610 and the partition information is input to the encoder.

The predictor 610 may include a motion estimator 612, a motion compensator 614, and an intra predictor 616, and predicts an input block. Here, the block refers to a macroblock of size M×N (M and N may be integers equal to or larger than "16") or a subblock or lower block of size O×P (O and P are integers equal to or smaller than M or N).

The motion estimator 612 generates a motion vector by comparing a block, which is desired to be encoded, with a reference picture stored in the frame memory 650 and estimating a motion of the corresponding block.

The motion compensator 614 fetches a block corresponding to a size of a block, which is desired to be encoded, from the reference picture stored in the frame memory 650 with reference to the motion vector generated by the motion estimator 612. The block having been fetched by the motion compensator 614 becomes a macroblock having a predicted value of the block, which is desired to be encoded.

The intra predictor 616 intra predicts the block, which is desired to be encoded. For the intra prediction, the intra predictor 616 generates a reference block by using reconstructed neighboring pixel information already encoded and decoded, and compares the reference block with the target block, which is to be encoded, to determine an intra prediction mode. And then, the intra predictor 606 intra predicts the block according to the determined intra prediction mode. The block having been predicted by the intra predictor 616 becomes a predicted block having a predicted value of the target block.

The encoder 620 encodes partition information indicating sizes and shapes of subblocks within the macroblock generated by the macroblock splitter 605. Specifically, the encoder 620 can entropy-encode the partition information. Further, the encoder 620 encodes prediction information of respective subblocks within the macroblock split by the partition information. Specifically, the encoder 620 can encode prediction mode information such as an intra prediction mode when a target block to be encoded is inter-predicted and motion information such as a motion vector generated by the motion estimator 612 is intra-predicted. Further, the encoder 620 encodes a residual signal, which is a difference between pixel values of each subblock and a predicted block. Specifically, the encoder 620 can encode the residual signal by transforming, quantizing, and entropy coding the residual signal.

The reconstructor 630 inversely quantizes and inversely transforms a transformed and quantized residual signal and adds the residual signal and the predicted block output from the predictor 610 to reconstruct the target block.

The filter 640 filters the reconstructed target macroblock by using a filter such as a deblocking filter. The filtered reconstructed macroblock is stored in the frame memory 650 and used for predicting a next macroblock or a macroblock of a next picture in the predictor 610.

Hereinafter, according to the present disclosure, elements of an encoder, which is differently operated from the known encoder, for performing an encoding by splitting a macroblock having an arbitrary size into subblocks having various sizes and shapes and determining a prediction mode by unit of subblocks will be described.

A.1.4. Macroblock Splitter

According to the typical video compression technology, since a macroblock size is fixed to a size 16×16, only subblocks having a small size such as subblocks of sizes 8×8, and 4×4 can be used. However, according to an embodiment of the present disclosure, since a macroblock size can be variously determined to have size 16×16 or more, sizes and shapes of subblocks can be also variously determined and thus the macroblock can be split into various shapes of subblocks. Therefore, according to another embodiment of the present disclosure, a predictive encoding should be performed by transmitting information on sizes and shapes of subblocks split from a macroblock to a video decoding apparatus and dividing the macroblock in the same way as that performed in a video encoding apparatus in the video decoding apparatus.

According to an embodiment of the present disclosure, a macroblock may be split into various sizes of subblocks for each layer, a predictive encoding and a predictive decoding for each split subblock may be performed.

Figure 11:
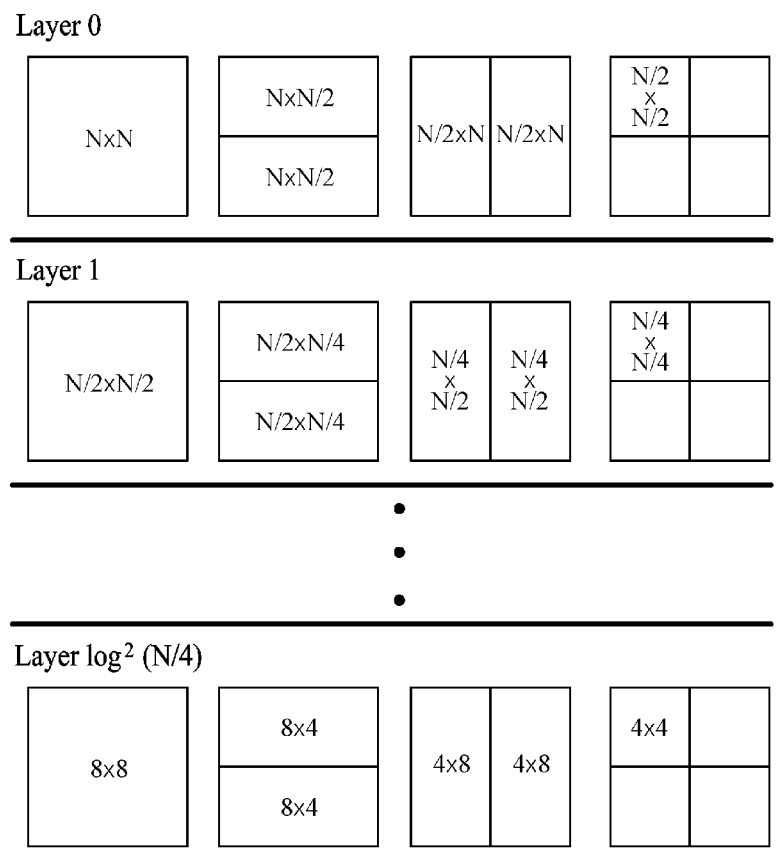
FIG. 11 is an exemplary diagram for illustrating subblocks split from a macroblock for each layer according to an embodiment of the present disclosure.

FIG. 11 is an exemplary diagram for illustrating subblocks split from a macroblock for each layer according to an embodiment of the present disclosure.

Macroblock sizes shown in FIG. 11 include a size N×N (N is an integer equal to or larger than 16). It is assumed that a minimum subblock size is 4×4. However, this assumption is for embodiments of the present disclosure, and a horizontal size and a vertical size of the macroblock may not be equal to each other and the minimum subblock size may have different sizes from the size 4×4.

As shown in FIG. 11, according to an embodiment of the present disclosure, a macroblock may be split into various sizes of subblocks for each layer. The macroblock may be split into four types of subblocks for each layer from a layer 0 to a layer log 2(N/4). In this event, subblocks of a K+1 layer can be used only when a macroblock of a layer K (0≤K≤log 2(N/4)) is split into four subblocks.

For example, in a case of a macroblock of size 64×64, the macroblock may be split into four layers from a layer 0 to a layer 3, and respective layers may include subblocks having four different block sizes. Accordingly, the layer 0 includes a subblock having a block size of 64×64, subblocks having a block size of 64×32, subblocks having a block size of 32×64, and subblocks having a block size of 32×32. A layer 1 includes a subblock having a block size of 32×32, subblocks having a block size of 32×16, subblocks having a block size of 16×32, and subblocks having a block size of 16×16. A layer 2 includes a subblock having a block size of 16×16, subblocks having a block size of 16×8, subblocks having a block size of 8×16, and subblocks having a block size of 8×8. The layer 3 includes a subblock having a block size of 8×8, subblocks having a block size of 8×4, subblocks having a block size of 4×8, and subblocks having a block size of 4×4. Here, subblocks included in the layer 1 can be used only when the macroblock having a block size of 64×64 is split into subblocks having a block size of 32×32 in the layer 0, and subblocks included in the layer 2 can be used only when the subblock having the block size 32×32 in the layer 1 is split into subblocks having a block size of 16×16. Further, subblocks included in the layer 3 can be used only when the subblock having the block size of 16×16 of the layer 2 is split into subblocks having a block size of 8×8. Here when a N×N block in a layer K is split into 4 subblocks having a size of $$\frac{N}{2} \times \frac{N}{2},$$

the split subblock $$\frac{N}{2} \times \frac{N}{2}$$

may be included in both the layer K and the layer K+1. That is, in the macroblock of size 64×64, a subblock having a size of 32×32 may be determined as a subblock type included in the layer 0 or a subblock type included in the layer 1.

In this event, a method of allocating a layer number to the split subblock may be different depending on the availability of each layer. If the layer K+1 is available, a layer number K+1 is allocated to a subblock. If the layer K+1 is not available, a layer number K is allocated to the subblock.

For example, in a case where a macroblock size is 64×64 and the number of maximum partition layers is 4, when the 64×64 macroblock is split into 4 subblocks of size 32×32, the 32×32 subblock is included in a layer 1. When one 32×32 subblock within the macroblock is split into 4 subblocks of size 16×16, each 16×16 subblock is included in a layer 2. When each 16×16 subblock is split into 4 subblock of size 8×8, the 8×8 subblock is included in a layer 3. When each 8×8 subblock is split into 4 subblocks of size 4×4, the 4×4 subblock is included in the layer 3 because a layer 4 is not available.

Further, when a N×N block of the layer K is split into four subblocks of size $$\frac{N}{2} \times \frac{N}{2},$$

a layer number of the split $$\frac{N}{2} \times \frac{N}{2}$$

subblock may be allocated K. In this event, when the $$\frac{N}{2} \times \frac{N}{2}$$

subblock is split into smaller subblocks, the layer number of the split $$\frac{N}{2} \times \frac{N}{2}$$

subblock is allocated K+1.

Figure 12:
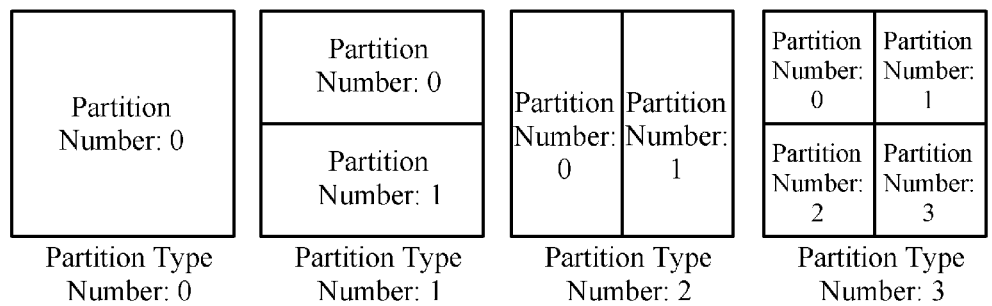
FIGS. 12 and 13 are exemplary diagram for illustrating partition types according to an embodiment of the present disclosure.
Figure 13:
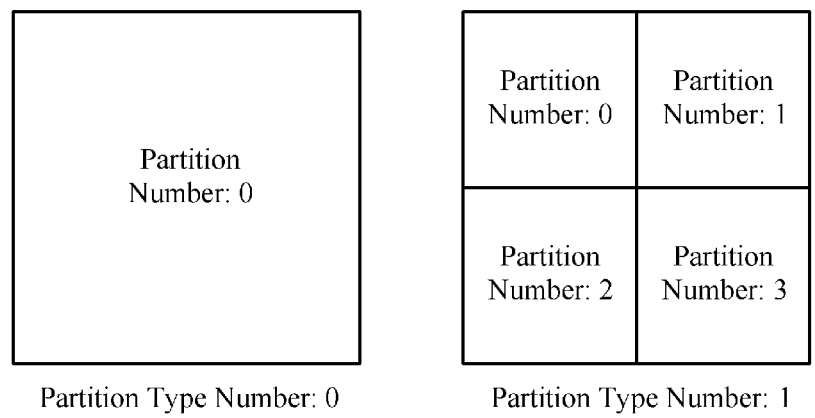

For example, in a case where a macroblock size is 64×64 and the number of maximum partition layers is 4, when the 64×64 macroblock is split into 4 subblocks of size 32×32, the 32×32 subblock is included in a layer 0. When one 32×32 subblock within the macroblock is split into 4 subblocks of size 16×16, each 16×16 subblock is included in a layer 1. When each 16×16 subblock is split into 4 subblocks of size 8×8, the 8×8 subblock is included in a layer 2. Further, when each 8×8 subblock is split into 4 subblocks of size 4×4, the 4×4 subblock is included in a layer 3. In addition, the macroblock may be split using various partition types as shown in FIGS. 12 and 13. FIGS. 12 and 13 are exemplary diagrams for illustrating partition types according to embodiments of the present disclosure.

FIG. 12 is an exemplary diagram for illustrating partition types according to an embodiment of the present disclosure.

FIG. 12 shows an example of partition type indicating information (partition type numbers) for identifying block sizes of subblocks split for each layer.

As shown in FIG. 12, when a subblock $$\frac{N}{2^K} \times \frac{N}{2^K}$$

included in a layer K of a macroblock is not split, a partition type number is allocated "0". When the subblock $$\frac{N}{2^K} \times \frac{N}{2^K}$$

is split into two subblocks of size $$\frac{N}{2^K} \times \frac{N}{2^{K-1}},$$

a partition type number is allocated "1". When the subblock $$\frac{N}{2^K} \times \frac{N}{2^K}$$

is split into two subblocks of size $$\frac{N}{2^{K+1}} \times \frac{N}{2^K},$$

a partition type number is allocated "2". When the subblock $$\frac{N}{2^K} \times \frac{N}{2^K}$$

is split into four subblocks of size $$\frac{N}{2^{K+1}} \times \frac{N}{2^{K+1}},$$

a partition type number is allocated "3". A partition number refers to a number allocated to for an identification of each subblock split based on a partition type. For example, when the subblock of the layer K is not split, a partition number of the unsplit subblock $$\frac{N}{2^K} \times \frac{N}{2^K}$$

is allocated "0". Further, when the subblock $$\frac{N}{2^K} \times \frac{N}{2^K}$$

of the layer K is split into four subblocks of size $$\frac{N}{2^{K+1}} \times \frac{N}{2^{K+1}},$$

the respective $$\frac{N}{2^{K+1}} \times \frac{N}{2^{K+1}}$$

subblocks may be sequentially allocated partition numbers 0, 1, 2, and 3 from a subblock located in a left upper part of the macroblock in a raster scan direction. FIG. 13 is an exemplary diagram for illustrating partition types according to an embodiment of the present disclosure.

FIG. 13 shows an example of partition type indicating information (partition type number) for identifying block sizes of subblocks split for each layer.

As shown in FIG. 13, when a subblock $$\frac{N}{2^K} \times \frac{N}{2^K}$$

included in a layer K of a macroblock is not split, partition type indicating information is allocated "0". When the subblock $$\frac{N}{2^K} \times \frac{N}{2^K}$$

is split into four subblocks of size $$\frac{N}{2^{K+1}} \times \frac{N}{2^{K+1}},$$

partition type indicating information is allocated "1". A partition number refers to a number allocated for an identification of each subblock split based on a partition type. For example, when the subblock $$\frac{N}{2^K} \times \frac{N}{2^K}$$

of the layer K is not split, a partition number of the unsplit subblock $$\frac{N}{2^K} \times \frac{N}{2^K}$$

is allocated "0". Further, when the subblock $$\frac{N}{2^K} \times \frac{N}{2^K}$$

of the layer K is split into four subblocks of size $$\frac{N}{2^{K+1}} \times \frac{N}{2^{K+1}}$$

the respective $$\frac{N}{2^{K+1}} \times \frac{N}{2^{K+1}}$$

subblocks may be sequentially allocated partition numbers 0, 1, 2, and 3 from a subblock located in a left upper part of the macroblock in a raster scan direction.

Further, various partition types may be combined and used for each layer. For example, the layer 0 and the layer 1 can use the partition type shown in FIG. 13 and lower layers of the layer 1 can also use the partition type shown in FIG. 12.

A.1.5. Variable-Length Encoder

The encoder 620 encodes partition information input by the macroblock splitter 605, a prediction type indicating whether each subblock is an intra mode or an inter mode, and prediction data according to the prediction type. The encoder 620 first encodes the partition information and then transmits sizes and shapes of subblocks within a macroblock to the decoder. Then, the encoder 620 encodes the prediction type and prediction data of each subblock.

A.1.5.1. Partition Information Encoding Method

Partition information indicating sizes and shapes of subblocks within a macroblock input by the macroblock splitter 605 is encoded in the encoder 620.

According to a partition information encoding method of the present disclosure, partition information indicating a type of a macroblock split into various sizes of subblocks may be represented using partition type indicating information (partition type numbers) for each layer. Accordingly, a plurality of subblocks included in a macroblock can be identified by the partition type indicating information for each layer. The encoder 620 can encode partition information of a block by using the partition type indicating information for each layer through various methods, which will be described later.

For example, the encoder 620 can encode partition information of a current block by sequentially encoding partition type indicating information for each partition layer of a macroblock based on a partition type indicating information encoding order.

Hereinafter, a method of encoding partition information of a current block through a sequential encoding of partition type indicating information for each partition layer of a macroblock based on a partition type indicating information encoding order will be described with reference to FIGS. 14 to 16.

Figure 14:
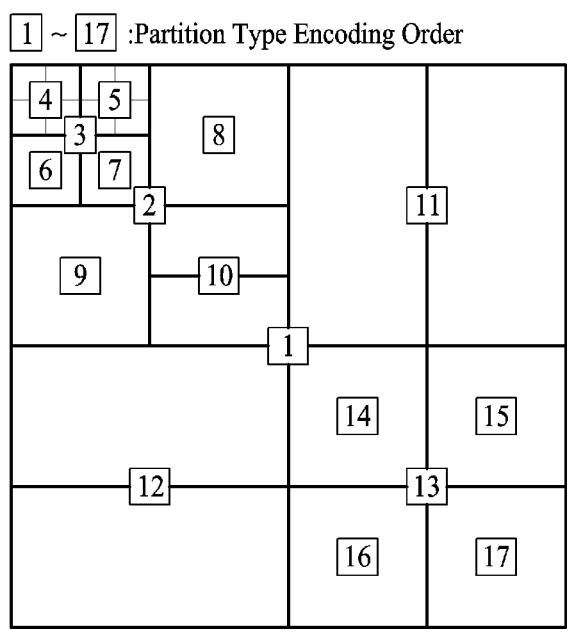
FIG. 14 is an exemplary diagram for illustrating a macroblock split into subblocks of various block sizes according to an embodiment of the present disclosure.

FIG. 14 is an exemplary diagram for illustrating a macroblock split into subblocks having various block sizes according to an embodiment of the present disclosure.

Figure 10:
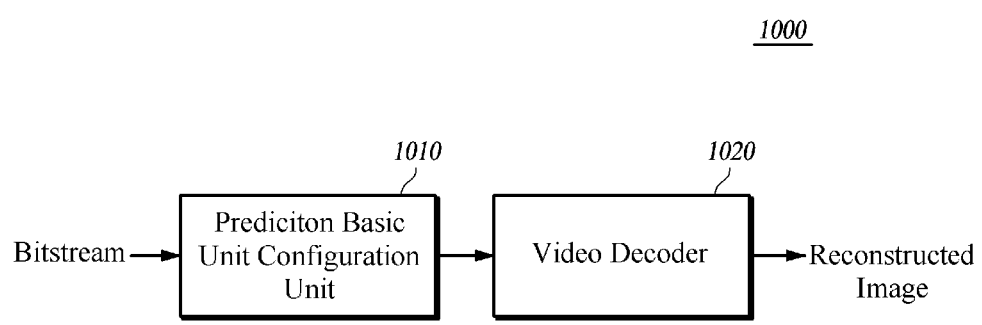
FIG. 10 is a schematic block diagram for illustrating a video decoding apparatus according to another embodiment of the present disclosure.

FIG. 14 shows the macroblock split into subblocks having various block sizes based on the subblock types shown in FIG. 10, wherein the macroblock has a block size of 64×64 and the number of maximum partition layers is 4.

According to an embodiment of the present disclosure, when the macroblock is split as shown in FIG. 14, partition information of the macroblock can be encoded by sequentially encoding partition type indicating information for each partition layer based on the partition type indicating information encoding order.

Figure 15:
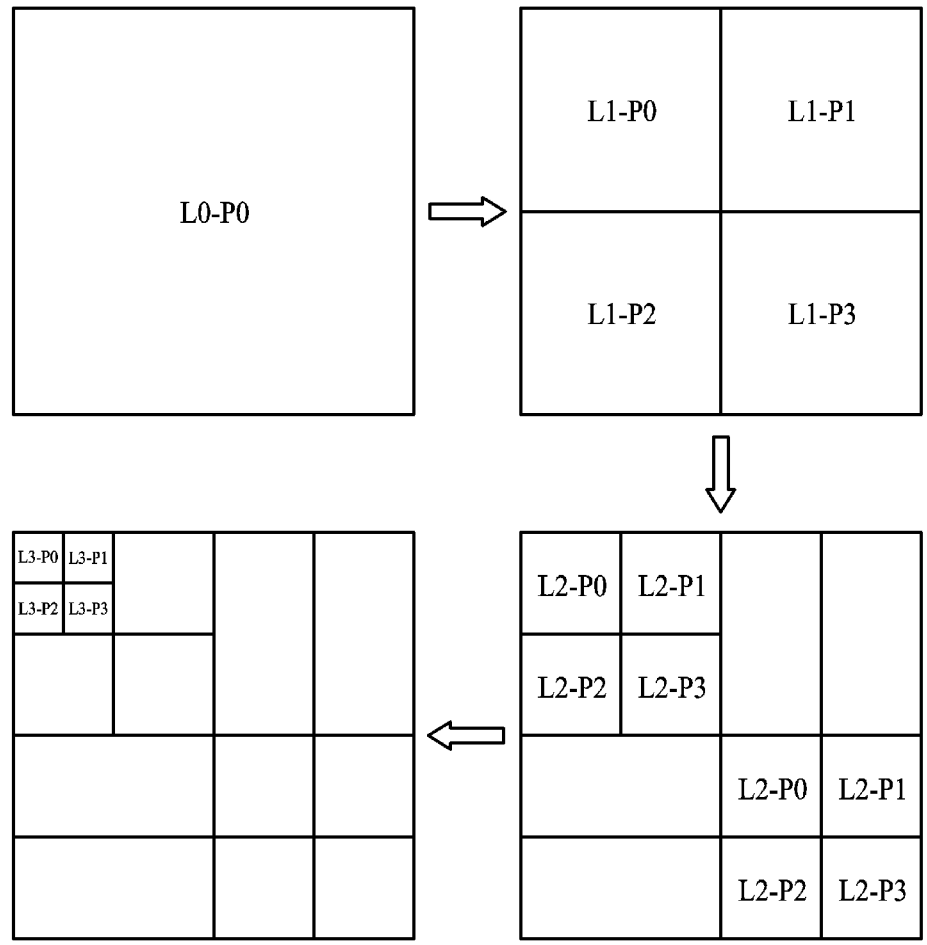
FIG. 15 is an exemplary diagram for sequentially illustrating processes in which a macroblock is split for each partition layer.

FIG. 15 shows processes of sequentially splitting the macroblock shown in FIG. 14 for each partition layer. Referring to FIG. 15, a subblock having a block size of 64×64 is split into 4 subblocks having a block size of 32×32 in a layer 0 (L0), an L1-P0 subblock (having a partition number 0 of a layer 1) and an L1-P3 subblock (having a partition number 3 of the layer 1) are split into 4 subblocks having a block size of 16×16, respectively (L1), and an L1-P1 subblock (having a partition number 1 of the layer 1) and an L1-P2 subblock (having a partition number 2 of the layer 1) are split into 2 subblocks having a block size of 16×32 and 2 subblocks having a block size of 32×16 in the layer 1, respectively. After the L1-P1 and L1-P2 subblocks are split into 2 subblocks, respectively, the subblocks are not split any more, so that partition numbers of the subblocks are not illustrated in FIG. 15. An L2-P0 subblock (having a partition number 0 of a layer 2) is split into 4 subblocks having a block size of 8×8 and an L2-P subblock (having a partition number 3 of the layer 2) is split into 2 subblocks having a block size of 16×2 in the layer 2 (L2). An L3-P0 subblock (having a partition number 0 of a layer 3) and an L3-P1 subblock (having a partition number 1 of the layer 3) are split into 4 subblocks having a block size of 4×4 in the layer 3 (L3), respectively. An order of encoding partition type indicating information is as follows.

Partition type indicating information on a macroblock partition type is first encoded. Then, if the macroblock is split into 4 subblocks, partition type indicating information on the respective split subblocks is successively encoded. For example, when a N×N block is split into 4 subblocks, partition type indicating information on a first (N/2)×(N/2) subblock is encoded. When the first (N/2)×(N/2) subblock is split into 4 subblocks, partition type indicating information on the split (N/4)×(N/4) subblocks is encoded. When a size of the split (N/4)×(N/4) subblock corresponds to a minimum subblock size or when the split (N/4)×(N/4) subblock is not split into 4 smaller subblocks any more, partition type indicating information on a next (N/4)×(N/4) subblock is encoded in a raster scan order. When the size of the (N/4)×(N/4) subblock does not correspond to the minimum subblock size and the (N/4)×(N/4) subblock is split into 4 subblocks having a block size of (N/8)×(N/8), an encoding is performed from partition type indicating information on a first (N/8)×(N/8) subblock. The encoding on the partition type indicating information is continuously performed until partition type indicating information on all subblocks within the macroblock is encoded. FIG. 16 is an exemplary diagram for illustrating a process of sequentially encoding partition type indicating information for each layer of a macroblock.

The table shown in FIG. 16 is generated when the partition type indicating information on respective subblocks within the macroblock shown in FIG. 14 is encoded. Numbers written in "□" refer to orders of encoding partition type indicating information of respective subblocks. If partition type indicating information for each layer of the macroblock is sequentially encoded according to a partition type indicating information encoding order, the partition type indicating information for each layer may be encoded according to the order shown in FIG. 14.

First, since the subblock (L0-P0) having the block size of 64×64 is split into 4 subblocks having a block size of 32×32, partition type indicating information 3 is encoded. Since the first subblock (L1-P0) having the block size of 32×32 among 4 subblocks having the block size 32×32 within the subblock having the block size of 64×64 is split into 4 subblocks having the block size of 16×16, partition type indicating information 3 is encoded. The first subblock (L2-P0) having the block size of 16×16 among 4 subblocks having the block size of 16×16 within the first subblock (L1-P0) having the block size of 32×32 is split into 4 subblocks having the block size of 8×8, a partition type 3 is encoded. Since 4 subblocks (L3-P0, L3-P1, L3-P2, and L3-P3) having the block size of 8×8 within the subblock (L2-P0) having the block size of 16×16 are not split into smaller subblocks any more, partition type indicating information {3, 3, 0, 0} is encoded, respectively. Since subblocks in the layer 3 cannot be split into smaller subblocks, partition type indicating information on the subblocks included in the layer 3 is not encoded.

Since partition type indicating information on subblocks included in the layer 3 has been fully encoded, partition type indicating information on a second subblock (L2-P1) having the block size of 16×16 and a third subblock (L2-P2) having the block size of 16×16 in the layer 2 encoded. However, in this event, they all are not split into smaller subblocks any more, so that partition type indicating information 0 is encoded. Since partition type indicating information is not 3 although a fourth subblock (L2-P3) having the block size of 16×16 is split into subblocks having the block size of 16×8, only partition type indicating information 1 is encoded. Since partition type indicating information on 4 subblocks included in the layer 2 has been fully encoded, partition type indicating information on a second subblock (L1-P1) having the block size of 32×32 in the layer 1 is encoded. In this event, since the second subblock (L1-P1) having the block size of 32×32 in the layer 1 is split into subblocks having the block size of 16×32 and the respective split subblocks are not split into smaller subblocks any more, partition type indicating information 2 is encoded. In the same way, partition type indicating information on a second subblock (L1-P2) having the block size of 32×32 and a fourth subblock (L1-P3) having the block size of 32×32 in the layer 1, and 4 lower subblocks (L2-P0, L2-P1, L2-P2, and L3-P3) having the block size of 16×16 are sequentially encoded, and thus {1, 3, 0, 0, 0, 0} is encoded.

If information on partition types of the macroblock shown in FIG. 14 is encoded according to such an encoding method, partition type indicating information {3, 3, 3, 3, 3, 0, 0, 0, 0, 1, 2, 1, 3, 0, 0, 0, 0} is encoded as shown in FIG. 16.

Further, the partition type indicating information can be encoded in the following order.

Partition type indicating information {3} of the layer 0 is encoded, partition type indicating information {3, 2, 1, 3} on 4 subblocks (L1-P0, L1-P1, L1-P2, and L1-P3) of the layer 1 is encoded, partition type indicating information {3, 0, 0, 1, 0, 0, 0, 0} on 8 subblocks (4 subblocks included in L1-P0 and 4 subblocks included in L1-P3) of the layer 2 is encoded, and partition type indicating information {3, 3, 0, 0} on 4 subblocks (4 subblocks included in L2-P0 within L1-P0) of the layer 3 is encoded. In this event, partition type indicating information {3, 3, 2, 1, 3, 3, 0, 0, 1, 0, 0, 0, 0, 3, 3, 0, 0} is encoded.

In this event, the partition type indicating information may be encoded into a binary bit string by using a lossless compression coding such as a binary arithmetic coding, a Huffman coding, etc.

Further, in a case of using the binary arithmetic coding, each of the partition type indicating information can use different binary values depending on layer numbers of partition type indicating information to be currently encoded.

In addition, an actual partition type indicating information value can be encoded using various binary coding methods such as a unary code, a truncated unary code, Exp-Golomb code, etc.

Furthermore, when a macroblock is split by using partition types shown in FIG. 16 according to an embodiment of the present disclosure, partition type indicating information may be a flag having a 1 bit length indicating whether a current block is split into 4 subblocks.

A.1.5.2. Predication Information Encoding Method

After encoding partition information of a macroblock, the encoder encodes a prediction type of each subblock and prediction data according to the prediction type.

A syntax indicating a prediction type and prediction data according to a picture type and an encoding and/or decoding method are as follows.

First, in a case of an intra picture, since all macroblocks of the intra picture are encoded using only an intra prediction, only prediction data indicating an intra predication mode of each subblock is encoded without encoding prediction type information.

In a case of an inter picture, since macroblocks are encoded selectively using an intra prediction or an inter prediction, prediction type information indicating whether the intra prediction or the inter prediction is performed for each subblock is encoded. Then, intra prediction mode information is encoded in a case of an intra block, and motion information is encoded in a case of an inter block.

Hereinafter, a method of encoding a prediction type and prediction data of each subblock input by the intra predictor 616 or the motion estimator 612.

A.1.5.2.1. Prediction Type Encoding Method

In a case of encoding prediction type information, an available prediction type may be different depending on a picture type.

In a case of a picture P, an available prediction type, which can be used by each subblock, may include a SKIP mode, an intra prediction, or an inter prediction for encoding motion information. Further, in a case of a picture B, an available prediction type, which can be used by each subblock, may include the SKIP mode, the intra prediction, the inter prediction for encoding motion information, or a Direct mode.

Further, the available prediction type may be different depending on a subblock size and shape. Tables 1 to 4 show examples of available prediction types according to a block size and shape. However, the prediction types according to the block shown in Tables 1 to 4 are only examples and different prediction types may be used, because it is preferable to use the inter mode in an area having no texture like a background in a case where both the intra mode and the inter mode are all available, and, in this event, a block size is substantially large. Further, it is preferable to select one of the intra mode and the inter mode in a complex area because a subblock size is substantially small in the complex area. Accordingly, if the predictive encoding is performed by selectively using the inter prediction or the intra prediction by unit of macroblocks, the encoding efficiency may be deteriorated because various areas can exist within a macroblock such as a macroblock of size 16×16 or more.

TABLE 1

| Subblock size and shape (macroblock size: N × M, subblock size: O × P, 0 < N, 0 < M, 0 < O <= N, 0 < P <= M) | Available prediction type (added prediction type in case of subblock within picture B) |
|---|---|
| O × P | SKIP, intra prediction, inter prediction, (Direct) |

TABLE 2

| Subblock size and shape (macroblock size: N × M, subblock size: O × P, 0 < N, 0 < M, 0 < O <= N, 0 < P <= M) | Available prediction type (added prediction type in case of subblock within picture B) |
|---|---|
| O × P (O ≠ P) | Inter prediction |
| O × P (O = P) | SKIP, intra prediction, inter prediction, (Direct) |

TABLE 3

| Subblock size and shape (macroblock size: N × M, subblock size: O × P, 0 < N, 0 < M, 0 < O <= N, 0 < P <= M) | Available prediction type (added prediction type in case of subblock within picture B) |
|---|---|
| 0 < O, P <= 4 and O = P | Intra prediction, inter prediction |
| 4 < O, P <= 8 and O = P | Intra prediction, inter prediction, (Direct) |
| 8 < O, 8 < P and O = P | SKIP, intra prediction, inter prediction, (Direct) |
| Other cases | Inter prediction |

TABLE 4

| Subblock size and shape (macroblock size: N × M, subblock size: O × P, 0 < N, 0 < M, 0 < O <= N, 0 < P <= M) | Available prediction type (added prediction type in case of subblock within picture B) |
|---|---|
| 0 < O, P <= 4 and O = P | Intra prediction, inter prediction |
| 4 < O, P <= 8 and O ≠ P | Inter prediction |
| 4 < O, P <= 8 and O = P | Intra prediction, inter prediction, (Direct) |
| 8 < O, 8 <= 16 and O ≠ P | Inter prediction |
| 8 < O, 8 <= 16 and O = P | SKIP, intra prediction, inter prediction, (Direct) |
| 16 < O, 16 < P and O ≠ P | Inter prediction |
| 16 < O, 16 < P and O = P | SKIP, inter prediction, (Direct) |

TABLE 5

| Subblock size and shape (macroblock size: N × M, subblock size: O × P, 0 < N, 0 < M, 0 < O <= N, 0 < P <= M) | Available prediction type (added prediction type in case of subblock within picture B) |
|---|---|
| 0 < O, P <= 16v | Intra prediction, inter prediction |
| 16 < O, P | Inter prediction |

When the number of available prediction types according to a subblock size and shape is 1, prediction type information is not encoded. Only when the number of available prediction types is 2 or more, the prediction type information is encoded.

When the number of available prediction types is 2 including the intra prediction or the inter prediction, a syntax having a 1 bit length can indicate whether the prediction type is the intra prediction or the inter prediction.

When the number of available prediction types is 3, the prediction type can be indicated using a syntax having a 1 bit length or 2 bit length. For example, when the three available prediction types are the SKIP mode, the inter prediction, and the intra prediction, 1 bit indicating whether the prediction type is the SKIP mode is first encoded. Then, when the prediction type is not the SKIP mode, 1 bit is further encoded to indicate whether the prediction type is an inter-predicted subblock or an intra-predicted subblock. Alternatively, when the three available prediction types are the Direct mode, the inter prediction, and the intra prediction, 1 bit indicating whether the prediction type is the Direct mode is encoded. Then, when the prediction type is not the Direct mode, 1 bit indicating whether the prediction mode is the intra prediction or the inter prediction may be further encoded.

When the three available prediction types are the SKIP mode, the Direct mode, and the inter prediction, 1 bit indicting whether the prediction type is the SKIP mode is first encoded. Then, when the prediction type is not the SKIP mode, it may be indicated whether the prediction type is a Direct-predicted subblock or an inter-predicted subblock by further encoding 1 bit.

When the number of available prediction types is 4, the prediction type can be encoded using a syntax having a 1 bit length, a 2 bit length, or a 3 bit length. For example, when the four available prediction types are the SKIP mode, the Direct mode, the inter prediction, and the intra prediction, 1 bit indicating the prediction type is the SKIP mode is first encoded. Then, when the prediction type is not the SKIP mode, 1 bit is further encoded to indicate whether the prediction type is the Direct mode. When the prediction type is neither the SKIP mode nor the Direct mode, 1 bit is encoded to indicate whether the prediction type is an inter-predicted subblock or an intra-predicted subblock.

Alternatively, the prediction type can be encoded by using a syntax having a fixed length of 2 bits.

Alternatively, the prediction type can be encoded using an arranged table.

In this event, a variable-length encoding method of the syntax indicating the prediction type may include various binary coding methods such as a unary code, a truncated unary code, an Exp-Golomb code, etc.

Further, in encoding a prediction type of a current block, the prediction type of the current block can be arithmetic-encoded by using prediction type information of neighboring blocks.

Although only one type of the syntax indicating the prediction type is herein described, the prediction type can be encoded using a plurality of syntaxes. For example, three syntaxes, which include a SKIP_flag indicating whether the prediction type is the SKIP mode, a Direct_flag indicating whether the prediction type is the Direct mode, and a pred_type indicating an intra block or an inter block, can be used. Further, the syntaxes can be encoded using different methods, respectively.

A.1.5.2.2. Prediction Mode Information Encoding Method

For subblocks in which the prediction type is the SKIP mode, encoding data of a next subblock is encoded because there is no data to be encoded any more for a current subblock.

When a picture type is a picture B and a subblock has a prediction type of the Direct mode, Pred_dir, which is information indicating a prediction direction, is encoded among an L0 prediction, an L1 prediction, and bidirectional prediction.

When the picture type is a picture P and the subblock has a prediction type of encoding motion information, a motion vector difference (MVD) and a reference picture index (ref_idx) indicating a reference picture are encoded. When the picture type is the picture B, Pred_dir is encoded and one or two motion vector information and the reference picture index according to the Pred_dir are encoded. However, when the number of reference images which can be referred to is one, the reference picture index is not encoded.

A prediction type identified by a subblock within an intra picture or prediction type information within an inter picture encodes intra prediction mode information for an intra-predicted subblock. For example, when a subblock size is 4×4, a prediction mode indicating a prediction mode selected from 9 intra prediction modes is encoded.

A.2. Decoding Apparatus

Figure 7:
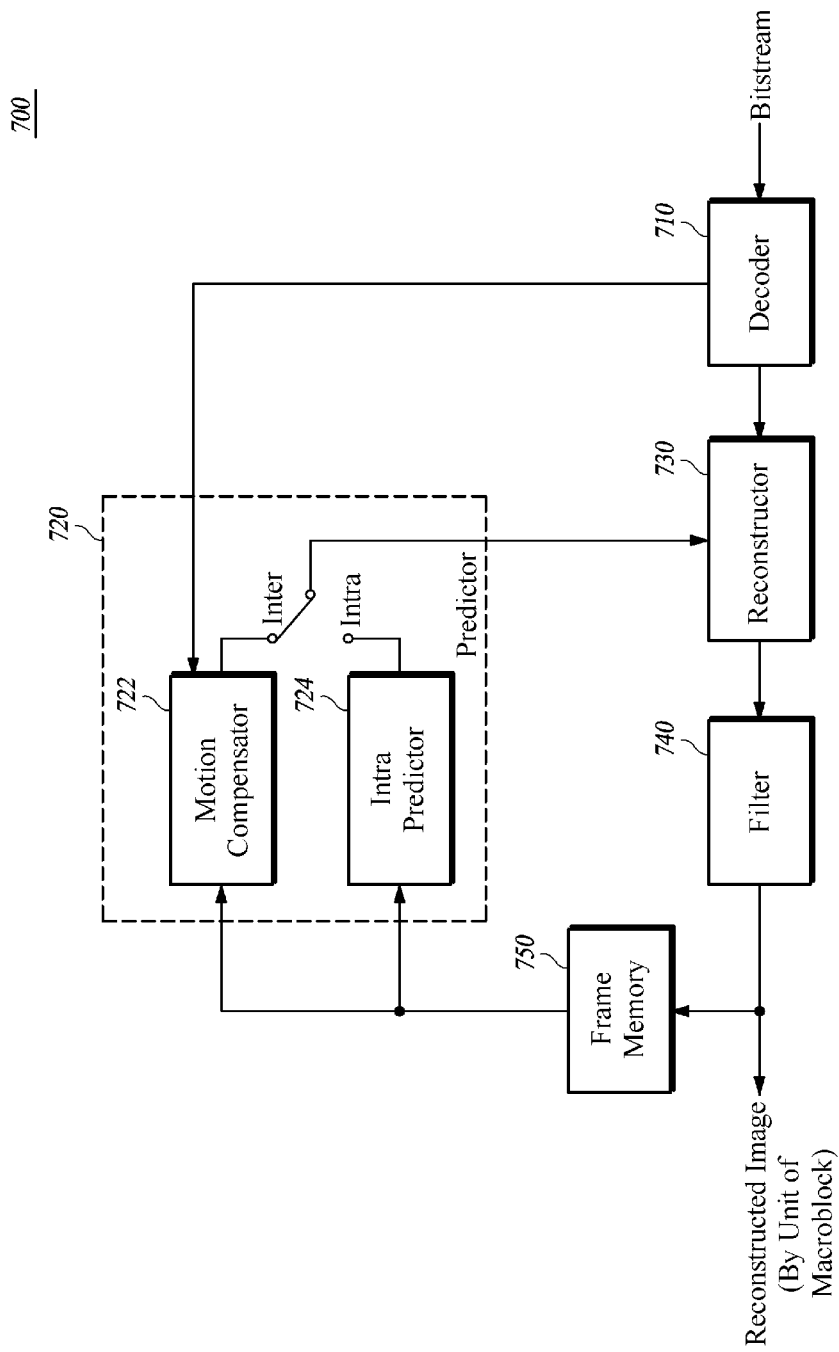
FIG. 7 is a schematic block diagram for illustrating a video decoding apparatus according to an embodiment of the present disclosure.

FIG. 7 is a schematic block diagram for illustrating a video decoding apparatus according to an embodiment of the present disclosure.

The video decoding apparatus according to the embodiment of the present disclosure may include a decoder 710, a predictor 720, a reconstructor 730, a filter 740, and a frame memory.

The decoder 710 extracts three types of information required for a macroblock decoding from an input bitstream.

First, the decoder 710 extracts partition information indicating respective subblock sizes and shapes within a macroblock to be currently decoded from the bitstream and entropy-decodes the extracted partition information. Since then, the decoder 710 can identify types of subblocks split from the macroblock by using reconstructed partition information. Second, the decoder 710 extracts prediction type information indicating whether respective subblocks have been intra-predicted or inter-predicted and prediction mode information required for the intra prediction or the inter prediction through an entropy decoding. In this event, a method of decoding a type of prediction data to be decoded and the prediction data is different depending on whether each block is an intra block or an inter block. When the block to be reconstructed is the inter block, reference picture information required for a motion compensation of each subblock and information on a motion such as a motion vector are extracted from the bitstream and decoded. When the block to be reconstructed is the inter block, information on intra prediction modes of a luma component and a chroma component is extracted form the bitstream and decoded.

Lastly, the decoder 710 decodes information required for a residual signal decoding. Information indicating whether there is a transform coefficient, which is not 0, in each subblock, for example, CBP is first decoded, and transform information indicating a transform type and a quantized transform coefficient are decoded for blocks having the transform coefficient, which is not 0.

The predictor 720 predicts a current block to be currently decoded, and may include a motion compensator 722 and an intra predictor 724. When the current block is the inter block, the motion compensator 722 generates a predicted block by fetching pixels having a size corresponding to a size of the current block from the reference picture stored in the frame memory by using a reconstructed motion vector decoded by the decoder. When the current block is the intra block, the intra predictor 724 generates a predicted block by predicting the current block according to a reconstructed intra prediction mode decoded by the decoder 710.

After generating a residual signal by inversely quantizing a quantized transform coefficient decoded by the decoder 710 and inversely transforming the inversely quantized transform coefficient by using a reconstructed transform type extracted from the decoder 710, the reconstructor 730 generates a reconstructed block by adding the generated residual signal and the predicted block generated by the predictor. The generated reconstructed block is filtered in the filter 740 and stored in the frame memory 750, and the filtered and stored block is used for reconstructing a next block or a next picture.

Hereinafter, operation methods of elements of a decoding apparatus, which is differently operated from the known decoder, among elements of the decoder according to the encoding method of the present disclosure will be described.

A.2.1. (Variable-Length) Decoder

After partition information is extracted from the bitstream and decoded in the decoder 710, a macroblock is split into one or more subblocks by using reconstructed partition information. Thereafter, a prediction type and prediction mode information of each subblock are extracted from the bitstream and decoded using size and shape information of subblocks within the macroblock.

A.2.1.1. Partition Information Decoding Method

Hereinafter, a method of decoding partition information, which indicates sizes and shapes of subblocks used for the prediction or the transform within the macroblock, according to an embodiment of the present disclosure will be described.

Partition type indicating information is decoded by using a subblock type available for each layer arranged with the encoder according to a promised order. For example, the subblock type available for each layer may include subblock types shown in FIGS. 15 and 16, and the order of decoding the partition type indicating information may include sequential orders shown in FIG. 14 or 16.

The decoding method is described under the same condition as that of the partition information encoding method. The partition information is decoded by using the subblock types shown in FIG. 15 and the order shown in FIG. 14.

The decoder 710 extracts first partition type indicating information from the bitstream and decodes the extracted first partition type indicating information, and then reconstructs partition type indicating information of a macroblock layer 0. When a value of the reconstructed partition type indicating information is 0, it denotes that the macroblock is not split into subblocks, so that a decoding of partition type indicating information of a current macroblock is terminated. Thereafter, the prediction or the inverse transform is performed using macroblocks of size N×N.

When the reconstructed partition type indicating information of the layer 0 is 1, the macroblock is split into two subblocks of size N×(N/2) and a decoding of the partition type indicating information of the current macroblock is terminated. Thereafter, the macroblock is predicted or inversely transformed by unit of N×(N/2) blocks.

When the reconstructed partition type indicating information of the layer 0 is 2, the macroblock is split into two subblocks of size (N/2)×N and a decoding of the partition type indicating information of the current macroblock is terminated. Thereafter, the macroblock is predicted or inversely transformed by unit of (N/2)×N blocks.

When the reconstructed partition type indicating information of the layer 0 is 3, the macroblock is split 4 subblocks of size $$\frac{N}{2} \times \frac{N}{2}$$

and partition type indicating information of a first subblock (having a partition number 0 of a layer 1) among the $$\frac{N}{2} \times \frac{N}{2}$$

subblocks is decoded.

Here, a layer number of $$\frac{N}{2} \times \frac{N}{2}$$

subblocks is allocated a value increased from a higher-layer number by 1.

When the decoded partition type indicating information of the subblock having the partition number 0 of the layer 1, which is extracted from the bitstream, is not 3, partition type indicating information of a second $$\frac{N}{2} \times \frac{N}{2}$$

subblock (having a partition number 1 of the layer 1) within the macroblock is decoded.

When the decoded partition type indicating information of the subblock having the partition number 0 of the layer 1, which is extracted from the bitstream, is 3, a current subblock is split into 4 subblocks and a layer number is allocated 2. Thereafter, partition type indicating information of a subblock corresponding to a partition number 0 of a layer 2 is extracted from the bitstream and decoded.

In a case where a layer number K of a current subblock having a partition number Y is a maximum value, which can be allocated to the subblock, if decoded partition type indicating information of the current subblock (that is, layer K-partition number Y) is 3, the current subblock is split into 4 subblocks and then partition type indicating information of a next subblock (layer K-partition number Y+1) is decoded in a raster scan order.

When the partition number of the current subblock is a maximum value, which can be allocated to the partition number included in the current layer, partition type indicating information of subblocks of the higher layer, which has not been decoded yet, is decoded.

Hereinafter, when a macroblock size is 64×64 and the number of maximum partition layers is 4, a decoding method according to an embodiment of FIG. 14 will be described. A value encoded into partition type indicating information in the encoder according to the embodiment of FIG. 14 is {3, 3, 3, 3, 3, 0, 0, 0, 0, 1, 2, 1, 3, 0, 0, 0, 0}.

First, partition type indicating information of a layer 0 is decoded.

Since the decoded partition type indicating information is 3, the 64×64 macroblock is split into 4 subblocks of size 32×32 (L1-P0, L1-P1, L1-P2, and L1-P3).

Since each 32×32 subblock can be subsplit into smaller subblocks, partition type indicating information of a first 32×32 subblock (L1-P0) within the 64×64 macroblock is decoded.

Since the secondly decoded partition type indicating information is 3, the L1-P0 subblock is split into 4 subblocks of size 16×16 (L2-P0, L2-P1, L2-P2, and L2-P3), and partition type indicating information of the L2-P0 subblock is extracted from the bitstream and decoded.

Since the thirdly decoded partition type indicating information is 3, the L2-P0 subblock of size 16×16 is split into 4 subblocks of size 8×8 (L3-P0, L3-P1, L3-P2, and L3-P3), and partition type indicating information of the L3-P0 subblock is extracted from the bitstream and decoded.

Since the fourthly decoded partition type indicating information is 3, the L3-P0 subblock is split into 4 subblocks of size 4×4. Here, since the number of maximum partition layers of the 4×4 subblock is 4, the 4×4 subblock cannot be subsplit into smaller subblocks any more, so that partition type indicating information of the L3-P1 subblock is extracted from the bitstream and decoded.

Since the fifthly decoded partition type indicating information is 3, the L3-P1 subblock of size 8×8 is split into 4 subblocks of size 4×4, and partition type indicating information of the L3-P2 subblock is extracted from the bitstream and decoded.

Since the sixthly decoded partition type indicating information is 0, the L3-P2 subblock of size 8×8 is not split, and partition type indicating information of the next subblock L3-P3 is extracted from the bitstream and decoded.

Since the seventhly decoded partition type indicating information is 0, the L3-P3 subblock of size 8×8 is not split. Here, since the partition number of the current subblock is a maximum value, which can be allocated to the partition number included in the current layer, partition type indicating information of the higher layer L2-P1 is extracted from the bitstream and decoded.

Since the eighthly decoded partition type indicating information is 0, a block size of the L2-P1 subblock becomes 16×16.

In the same way, partition type indicating information of the L2-P2 and L2-P3 subblocks is extracted from the bitstream and decoded, and thus each subblock type is determined.

Since the ninthly decoded partition type indicating information is also 0, a block size of the L2-P2 subblock is 16×16. Since the tenthly decoded partition type indicating information is 1, the L2-P3 subblock is split into 2 subblocks of size 16×8.

All partition type indicating information of subblocks included in the layer 2 has been decoded, so that partition type indicating information of the second subblock L1-P1 of size 32×32 of the layer 1, which is a higher layer, is decoded.

Since the eleventhly decoded partition type indicating information is 2, the L1-P1 subblock of size 32×32 is split into two subblocks of size 16×32, and partition type indicating information of the L1-P2 subblock is decoded.

Since the twelvethly decoded partition type indicating information is 1, the L1-P2 subblock of size 32×32 is split into two subblocks of size 32×16, and partition type indicating information of the L1-P3 subblock is decoded.

Since the thirteenthly decoded partition type indicating information is 3, the D-P subblock of size 32×32 is split into four subblocks (L2-P0, L2-P1, L2-P2, and L2-P3) of size 16×16, and partition type indicating information of respective subblocks is decoded in the same way.

Since the fourteenthly decoded partition type indicating information is 0, a subblock type of L2-P0 is 16×16, and partition type indicating information of the next subblock L2-P1 is decoded because the L2-P0 subblock is not split any more.

Since the fifteenthly decoded partition type indicating information is 0, a subblock type of L2-P1 is 16×16, and partition type indicating information of the next subblock L2-P2 is decoded because the L2-P1 subblock is not split any more.

Since the sixteenthly decoded partition type indicating information is 0, a subblock type of L2-P2 is 16×16, and partition type indicating information of the next subblock L2-P3 is decoded because the L2-P2 subblock is not split any more.

Since the seventeenthly decoded partition type indicating information is 0, a subblock type of L2-P3 is 16×16, and the decoding of partition type indicating information for a current macroblock decoding is terminated because all subblock types within the macroblock have been determined.

Hereinafter, a method of decoding partition type indicating information when partition type indicating information of the lower layer is encoded after partition type indicating information of the higher layer is fully encoded according to the partition type indicating information encoding order will be described using the embodiment of FIG. 14.

The value encoded into partition type indicating information in the encoder according to the embodiment of FIG. 14 is {3, 3, 2, 1, 3, 3, 0, 0, 1, 0, 0, 0, 0, 3, 3, 0, 0}.

First, partition type indicating information of the layer 0 is decoded.

Since partition type indicating information of the layer 0 is 3, the 64×64 macroblock is split into 4 subblocks of size 32×32 (L1-P0, L1-P1, L1-P2, and L1-P3).

4 partition type indicating information pieces are decoded because there are 4 subblocks included in the layer 1. Since reconstructed partition type indicating information of the subblocks (L1-P0, L1-P1, L1-P2, and L1-P3) from the bitstream is {3, 2, 1, 3}, the L1-P0 and L1-P3 subblocks are split into 4 subblocks of size 16×16, the L1-P1 subblock is split into 2 subblocks of size 16×32, and the L1-P2 subblock is split into 2 subblocks of size 32×16.

Partition type indicating information of 8 subblocks of size 8×8 of the layer 2 included in the L1-P0 and L1-P3 subblocks is extracted from the bitstream and decoded.

Since partition type indicating information of 4 subblocks (L2-P0, L2-P1, L2-P2, and L2-P3) included in the reconstructed L1-P0 is {3, 0, 0, 1} and partition type indicating information of 4 subblocks (L2-P0, L2-P1, L2-P2, and L2-P3) included in the L1-P3 is {0, 0, 0, 0}, the L2-P0 subblock included in the L1-P0 subblock is split into 4 subblocks of size 4×4, and the L2-P3 subblock is split into 2 subblocks of size 8×4.

Since partition type indicating information of the L2-P1 and L2-P2 subblocks included in the L1-P0 subblock and 4 subblocks included in the L1-P subblock is all 0, the subblocks are not split.

Since although the L2-P0 subblock included in the L1-P0 subblock is split into 4 subblocks, the 4 subblocks cannot be subsplit into smaller subblocks, and the decoding of partition type indicating information for a current macroblock decoding is terminated.

In this event, the partition type indicating information is entropy-decoded using a method arranged with the encoder among lossless compression encoding and/or decoding methods such as a binary arithmetic coding, a Huffman coding, etc.

Further, an actual partition type indicating information value can be decoded using various binary coding methods such as a unary code, a truncated unary code, an Exp-Golomb code, etc.

In addition, when the encoder uses the binary arithmetic coding and different binary tables according to a layer number of the partition type indicating information as the method of encoding the partition type indicating information, the decoder also performs an entropy decoding by using the binary tables according to the layer number arranged with the encoder.

Furthermore, when it is arranged with the encoder that a partition type according to another embodiment of the present disclosure shown in FIG. 16 should be used, it may be determined whether a current subblock is split into 4 subblocks by entropy decoding 1 bit for a partition type indicating information decoding.

A.2.1.2. Prediction Information Decoding Method

The decoder decodes prediction type information of each subblock within a macroblock and prediction data according to the prediction type.

In this event, in the prediction type information decoding method, a decoding is not performed from the bitstream according to a picture type. For example, in a case of the intra picture, prediction type information is extracted from the bitstream and not decoded, and an intra prediction is performed for all macroblocks within the intra picture and all subblocks within the macroblocks.

In a case of the inter picture, after prediction type information is extracted from the bitstream and decoded, a prediction type indicating whether respective blocks are intra-predicted or inter-predicted is reconstructed.

Thereafter, motion information and intra mode information according to a prediction type of each block determined by the picture type and the prediction type information transmitted through the bitstream is extracted and decoded.

A.2.1.2.1. Prediction Type Information Decoding Method

When prediction types of subblocks are determined by the picture type and the prediction type information transmitted through the bitstream, a prediction type information decoding process is performed. Hereinafter, the prediction type information decoding process will be described.

Available prediction types are different depending on the picture type and a subblock size and shape, and the prediction type information decoding method becomes different depending on the prediction type.

For example, in a case of the picture P, available prediction types, which can be used by each subblock, may include the SKIP mode, the intra prediction, or the inter prediction for encoding motion information.

In a case of the picture B, available prediction types, which can be used by each subblock, may include the SKIP mode, the intra prediction, the inter prediction for encoding motion information, or the Direct mode.

Further, available prediction types may be different depending on the subblock size and shape as shown in Tables 1 to 4 described above.

When it is determined that the number of available prediction types according to the subblock size and shape is 1, prediction type information is not decoded and the prediction type information is extracted and decoded only for subblocks having two or more prediction types.

When the number of available prediction types of the subblock to be decoded is 2, 1 bit is extracted from the bitstream and entropy-decoded, and then a prediction type selected from the intra prediction and the inter prediction is set.

When the number of available prediction types is 3, 1 bit or 2 bits are extracted from the bitstream and decoded. For example, when the number of available prediction types is 3 including the SKIP mode, the inter prediction, and the intra prediction, 1 bit indicating whether the prediction type is the SKIP mode is first decoded. When the prediction type is not the SKIP mode, 1 bit is further extracted from the bitstream and decoded to determine whether the prediction type is an inter-predicted subblock or an intra-predicted subblock. Alternatively, when the available prediction types are the Direct mode, the inter prediction, and the intra prediction, 1 bit indicating whether the prediction type is the Direct mode is extracted from the bitstream and decoded. When the prediction type is not the Direct mode, 1 bit indicating whether the prediction mode is the intra prediction or the inter prediction may be further extracted and decoded.

When the number of available prediction types is 3 including the SKIP mode, the Direct mode, and the inter prediction, 1 bit indicting whether the prediction type is the SKIP is first decoded. Then, when the prediction type is not the SKIP mode, 1 bit is further decoded to determine whether the prediction type is a Direct-predicted subblock or an inter-predicted subblock.

When the number of available prediction types is 4, the prediction type can be decoded by extracting 1 bit, 2 bits, or 3 bits from the bitstream and decoding the extracted bits. For example, the four available prediction types are the SKIP mode, the Direct mode, the inter prediction, and the intra prediction, 1 bit indicating whether the prediction type is the SKIP is first decoded. Then, when the prediction type is not the SKIP mode, 1 bit is further decoded to indicate whether the prediction type is the Direct mode. When the prediction type is neither the SKIP mode nor the Direct mode, 1 bit is decoded to determine whether the prediction type is an inter-predicted subblock or an intra-predicted subblock.

Alternatively, the prediction type can be decoded by extracting 2 bits from the bitstream and decoding the extracted 2 bits.

Alternatively, the prediction type can be decoded by using a table arranged with the encoder.

In this event, the variable-length decoding method of the syntax indicating the prediction type may include various binary coding methods such as a unary code, a truncated unary code, an Exp-Golomb code, etc.

Further, in decoding a prediction type of a current block, the prediction type can be arithmetic-decoded using prediction type information of neighboring blocks.

Although only one type of the syntax indicating the prediction type is herein described, the prediction type can be decoded using a plurality of syntaxes. For example, three syntaxes, which include a SKIP_flag indicating whether the prediction type is the SKIP mode, a Direct_flag indicating whether the prediction type is the Direct mode, and a pred_type indicating an intra block or an inter block, can be used. Further, the syntaxes can be decoded using different methods, respectively.

A.2.1.2.2. Prediction Mode Information Decoding Method

For subblocks in which the prediction type is the SKIP mode, encoding data of a next subblock is decoded because there is no data to be decoded any more for a current subblock.

When a picture type is the picture B and a subblock has a prediction type of the Direct mode, Pred_dir, which is information indicating a prediction direction, is decoded among an L0 prediction, an L1 prediction, and bidirectional prediction.

When the picture type is the picture P and the subblock has a prediction type of encoding motion information, a motion vector difference (MVD) and a reference picture index (ref_idx) indicating a reference picture are decoded. When the picture type is the picture B, Pred_dir is decoded and one or two motion vector information and the reference picture index according to the Pred_dir are decoded. However, when the number of reference images which can be referred to is one, the reference picture index is not decoded.

A prediction type identified by a subblock within an intra picture or prediction type information within an inter picture decodes intra prediction mode information for an intra-predicted subblock. For example, when a subblock size is 4×4, a prediction mode indicating a prediction mode selected from 9 intra prediction modes is decoded.

As described above, the video encoding apparatus and the video decoding apparatus according to an embodiment of the present disclosure can encode and decode an image by using blocks having an arbitrary size, and encode/decode an image by using various prediction types and modes such as the SKIP mode, the Direct mode, the intra prediction, the inter prediction, etc. for each subblock.

Embodiment 2

An encoding and/or decoding apparatus and method selectively using the intra prediction or the inter prediction for subblocks within a variable sized macroblock while saving bits spent for prediction type information Hereinafter, as another embodiment of the present disclosure, an example of an encoding and/or decoding apparatus and method selectively using the intra prediction or the inter prediction for subblocks within a variable sized macroblock while saving bits spent for prediction type information will be described.

After encoding macroblocks by using only an available prediction type according to a macroblock size and type, a video encoding method according to another embodiment of the present disclosure compares encoding costs to determine a macroblock type and performs a predictive encoding on each subblock in accordance with the determined macroblock type and an available prediction type and prediction mode according to the macroblock type to generate a bitstream.

For example, the macroblock type is determined by comparing an encoding cost generated when a macroblock having an arbitrary size is encoded using only the intra prediction, an encoding cost generated when the macroblock is encoded using only the inter prediction, and an encoding cost generated when the macroblock is encoded using both the intra prediction and the inter prediction, and the bitstream is generated by performing the predictive encoding on each subblock in accordance with the determined macroblock type and the selected prediction scheme of each subblock. In this event, only when the determined macroblock type corresponds to a macroblock type using both the intra prediction and the inter prediction, prediction type information and prediction mode information are encoded for subblocks within the macroblock. In a case of other macroblock types, only the prediction mode information is encoded and the bitstream is generated.

Further, the predictive encoding may be performed by using only one of the inter prediction and the intra prediction according to a macroblock size, or by selectively using the inter prediction or the intra prediction. That is, the macroblock type may be different depending on the macroblock size. For example, when the macroblock size is 32×32 or more, the predictive encoding can be performed by using a macroblock type, which can selectively use the intra prediction or the inter prediction by unit of subblocks within the macroblock. However, when the macroblock size is 16×16 or 8×8, the intra prediction or the inter prediction is selectively used by unit of macroblocks. In this event, when the encoding can be performed by selectively using the intra prediction or the inter prediction by unit of subblocks within the macroblock, prediction type information is encoded only in a case of the macroblock type.

When the macroblock size is large, various areas can exist within the macroblock. For example, in a case of the macroblock of size 64×64, background areas and new areas, which have not existed in a previous picture, can be included in the macroblock. In this case, the encoding efficiency can be deteriorated if the intra prediction or the inter prediction is selectively used by unit of macroblocks. Accordingly, in a case of the large macroblock, the encoding efficiency may be increased by enabling various prediction types and modes to be used within the macroblock. Further, in a case of the small macroblock, the number of bits required for prediction type information can be reduced by minimizing the prediction types through the selective use of the intra prediction or the inter prediction by unit of macroblocks.

B.1. Encoding Apparatus

A video encoding apparatus according to yet another embodiment of the present disclosure may be constructed equally or similarly to the aforementioned video encoding apparatus according to an embodiment of the present disclosure.

However, the video encoding apparatus according to yet another embodiment of the present disclosure encodes macroblocks by using only a prediction type according to a macroblock type, determining the macroblock type and prediction types of subblocks within the macroblock by comparing encoding costs, and generates a bitstream by performing a predictive encoding on respective subblocks according to a selected prediction scheme. For example, the macroblock type is determined by comparing an encoding cost generated when only the inter prediction is used, an encoding cost generated when only the inter prediction is used, and an encoding cost generated when both the intra prediction and the inter prediction are used, and the bitstream is generated by performing the predictive encoding on each subblock according to the selected prediction scheme.

When each subblock within the macroblock corresponds to the macroblock type, which can selectively use the intra prediction or the inter prediction, the video encoding apparatus according to yet another embodiment of the present disclosure encodes information on the prediction type indicating whether each subblock is encoded by using the inter prediction or the intra prediction and includes the encoded information in the bitstream.

Therefore, according to yet another embodiment of the present disclosure, all subblocks within one macroblock can be predictive-encoded using the inter prediction or using the intra prediction, and some subblocks can be inter-predicted and the remaining subblocks can be intra-predicted, which reduces bits spent for the prediction type information.

Hereinafter, a method of encoding the macroblock type and prediction information including the prediction type and prediction mode information after the partition information encoding will be described.

B.1.1. Prediction Information Encoding Method

Macroblock types may include an SKIP macroblock, an intra macroblock, an inter macroblock, and a mixed inter/intra macroblock. In the SKIP macroblock, all subblocks within the macroblock perform an encoding by using only the SKIP mode. In the intra macroblock, all subblocks within the macroblock perform an encoding by using only the intra prediction. In the inter macroblock, all subblock within the macroblock perform an encoding by using the inter prediction for transmitting motion information or residual signal information. The mixed inter/intra macroblock performs an encoding by using the intra prediction or the inter prediction for transmitting motion information or residual signal information by unit of subblocks within the macroblock.

Further, the macroblock types may include only the intra macroblock and the inter macroblock. In this event, all subblocks within the intra macroblock perform an encoding by using only the intra prediction, and all subblocks within the inter macroblock can perform an encoding by selectively using the intra prediction or the inter prediction for implementing a motion estimation and compensation by unit of subblocks.

After encoding macroblock partition information, the encoder encodes the macroblock type.

Here, the macroblock type may be fixed according to a picture type, or may be selected and determined by comparing encoding costs.

For example, in a case of the intra picture, all macroblock types within the picture are fixed to the intra macroblock. In this event, only prediction mode data indicating the intra prediction mode of each subblock is encoded without encoding the macroblock type and the prediction type.

In a case of the inter picture, the macroblock type is determined according to the encoding cost, and the selected macroblock type is encoded. Then, when the number of available prediction types according to the macroblock type is 2 or more, a prediction type of each subblock is encoded. For a subblock having the intra prediction type as the prediction type, intra prediction mode information is encoded. For a subblock having the inter prediction type as the prediction type, motion information is encoded.

Prediction mode data is encoded by using the prediction mode information encoding method according to the aforementioned embodiment.

Hereinafter, a method of encoding the macroblock type will be described.

B.1.1.1. Macroblock Type Encoding Method

When the macroblock type is encoded like the macroblock within the inter picture, available macroblock types according to the picture type may be different as shown in Tables 6 to 9. However, macroblock types and available prediction types of subblocks according to macroblock types shown in Tables 6 to 8 are only examples, and different macroblocks and prediction types may be used.

TABLE 6

| Macroblock type | Available prediction type (added prediction type in case of subblock within picture B) |
|---|---|
| SKIP macroblock | SKIP |
| Mixed inter/intra macroblock | SKIP, intra prediction, inter prediction, (Direct) |
| Inter macroblock | SKIP, inter prediction, (Direct) |

TABLE 7

| Macroblock type | Available prediction type (added prediction type in case of subblock within picture B) |
|---|---|
| SKIP macroblock | SKIP |
| Intra macroblock | Intra prediction |
| Inter macroblock | Inter prediction, (Direct) |
| Mixed inter/intra macroblock | Inter prediction, Intra prediction, (Direct) |

TABLE 8

| Macroblock type | Available prediction type (added prediction type in case of subblock within picture B) |
|---|---|
| SKIP macroblock (Direct macroblock) | SKIP (Direct Mode) |
| Intra macroblock | Intra prediction |
| Inter macroblock | Inter prediction |
| Mixed inter/intra macroblock | Inter prediction, intra prediction |

TABLE 9

| Macroblock type | Available prediction type (added prediction type in case of subblock within picture B) |
|---|---|
| SKIP macroblock | SKIP |
| Intra macroblock | Intra prediction |
| Inter macroblock | Inter prediction |
| (Direct macroblock) | (Direct Mode) |

When the number of available macroblock types is 3 as shown in Table 6, the macroblock type can be indicated by encoding 1 bit or 2 bits. For example, a syntax having a 1 bit length indicating whether the macroblock type is the SKIP macroblock is encoded. Then, when the macroblock type is not the SKIP macroblock, a syntax having a 1 bit length indicating whether the macroblock type is the mixed inter/intra macroblock or the inter macroblock is further encoded.

When the number of available macroblock types is 4, the macroblock type can be indicated by encoding 1 bit, 2 bits, or 3 bits. For example, in Table 7, a syntax having a 1 bit length indicating whether the macroblock type is the SKIP macroblock, for example, skip_flag is encoded. Then, when the macroblock type is not the SKIP macroblock, the syntax indicating the macroblock type can be encoded by using a binary string shown in Table 10. Alternatively, a macroblock type of a target macroblock to be currently encoded can be encoded by using neighboring macroblocks of the target macroblock to be currently encoded, for example, using macroblock types of an upper macroblock and a left macroblock of the target macroblock. Alternatively, the macroblock type can be encoded by using a code word table promised between the encoder and the decoder.

TABLE 10

| Macroblock type | Code word |
|---|---|
| Intra macroblock | 00 |
| Inter macroblock | 1 |
| Mixed inter/intra macroblock | 01 |

When the number of available macroblock types is 5 as shown in Table 8, the macroblock type can be indicated by encoding 1 bit or 3 bits. For example, in Table 8, a syntax having a 1 bit length indicating whether the macroblock type is the SKIP macroblock, for example, skip_flag is encoded. Then, when the macroblock type is not the SKIP macroblock, the syntax indicating the macroblock type can be encoded by using a binary string shown in Table 11. Alternatively, a macroblock type of a target macroblock to be currently encoded can be encoded by using neighboring macroblocks of the target macroblock to be currently encoded, for example, using macroblock types of an upper macroblock and a left macroblock of the target macroblock. Alternatively, the macroblock type can be encoded by using a code word table promised between the encoder and the decoder.

TABLE 11

| Macroblock type | Code word |
|---|---|
| Direct macroblock | 10 |
| Intra macroblock | 00 |
| Inter macroblock | 11 |
| Mixed inter/intra macroblock | 01 |

Further, the variable-length encoding method of the syntax indicating the macroblock type may include various binary coding methods such as a unary code, a truncated unary code, an Exp-Golomb code, etc.

Further, the macroblock type can be arithmetic-encoded by using prediction type information of blocks.

Although two types of the syntaxes, which include the syntax (skip_flag) for indicating whether the macroblock type is the SKIP macroblock and the syntax (mb_type) for indicating macroblock types except for the SKIP macroblock type when the macroblock type is not the SKIP macroblock, are used herein to indicate the macroblock type, the macroblock type can be encoded by using one syntax or three or more syntaxes.

B.1.1.2. Prediction Type Encoding Method According to the Macroblock Type

When the number of available prediction types according to the macroblock type is 2 or more, prediction type information of each subblock within the macroblock is encoded. When the number of available prediction types of subblocks according to the macroblock types shown in Tables 6 to 8 is 2, a syntax having a 1 bit length indicating a prediction type of each subblock is encoded.

When the number available prediction types is 3, the prediction type can be indicated by using a syntax having a 1 bit or 2 bit length. For example, when the available prediction types are three types including the SKIP mode, the inter prediction, and the intra prediction, 1 bit indicating whether the prediction type is the SKIP mode is first encoded. When the prediction type is not the SKIP mode, 1 bit is further encoded to indicate whether the prediction type is an inter-predicted subblock or an intra-predicted subblock. Alternatively, when the available prediction types are the Direct mode, the inter prediction, and the intra prediction, 1 bit indicating whether the prediction type is the Direct mode is encoded. When the prediction type is not the Direct mode, 1 bit indicating whether the prediction type is the intra prediction or the inter prediction may be further encoded.

When the three available prediction types are the SKIP mode, the Direct mode, and the inter prediction, 1 bit indicting whether the prediction type is the SKIP mode is first encoded. Then, when the prediction type is not the SKIP mode, 1 bit is further encoded to indicate whether the prediction type is a Direct-predicted subblock or an inter-predicted subblock.

When the number of available prediction types is 4, the prediction type can be encoded using a syntax having a 1 bit length, a 2 bit length, or a 3 bit length. For example, the four available prediction types are the SKIP mode, the Direct mode, the inter prediction, and the intra prediction, 1 bit indicating whether the prediction type is the SKIP mode is first encoded. Then, when the prediction type is not the SKIP mode, 1 bit is further encoded to indicate whether the prediction type is the Direct mode. When the prediction type is neither the SKIP mode nor the Direct mode, 1 bit is encoded to indicate whether the prediction type is an inter-predicted subblock or an intra-predicted subblock.

Alternatively, the prediction type can be encoded using a syntax having a fixed length of 2 bits.

Alternatively, the prediction type can be encoded using an arranged table.

In this event, a variable-length encoding method of the syntax indicating the prediction type may include various binary coding methods such as a unary code, a truncated unary code, an Exp-Golomb code, etc.

Further, in encoding a prediction type of a current block, the prediction type of the current block can be arithmetic-encoded using prediction type information of neighboring blocks.

Although only one type of the syntax indicating the prediction type is described herein, the prediction type can be encoded using a plurality of syntaxes. For example, three syntaxes, which include a SKIP_flag indicating whether the prediction type is the SKIP mode, a Direct_flag indicating whether the prediction type is the Direct mode, and a pred_type indicating an intra block or an inter block, can be used. Further, the syntaxes can be encoded using different methods, respectively.

B.2. Decoding Apparatus

A video decoding apparatus according to yet another embodiment of the present disclosure may be constructed equally or similarly to the video decoding apparatus according to an embodiment of the present disclosure. However, the video decoding apparatus according to yet another embodiment of the present disclosure decodes and reconstructs a macroblock type of a macroblock having an arbitrary size from a bitstream, and extracts and decodes prediction type information from the bitstream only when the number of available prediction types of subblocks within the macroblock according to the macroblock type is 2 or more. In a case where the prediction type of each subblock is reconstructed, when the prediction type of the subblock is the intra prediction, intra prediction mode information is extracted and decoded from the bitstream. When the prediction type is the inter prediction, which includes motion information or residual signal information in the bitstream, the motion information or the residual signal information are extracted and decoded from the bitstream and each subblock is reconstructed.

Hereinafter, a method of decoding the macroblock type and prediction information including the prediction type and prediction mode information after the partition information decoding will be described.

B.2.1. Prediction Information Decoding Method

After decoding macroblock partition information, the decoder extracts and decodes macroblock type information from the bitstream by using picture type information. In this event, when an available macroblock type according to the picture type is fixed, a macroblock type information decoding process from the bitstream is not performed.

For example, since macroblocks within the intra picture can use only the intra prediction, a process of extracting and decoding macroblock type information and prediction type information from the bitstream is not performed and intra prediction mode information of each block is extracted and decoded from the bitstream and then reconstructed.

In a case of macroblocks within the inter picture, macroblock type information is extracted and decoded from the bitstream. Then, prediction type information is extracted and decoded from the bitstream only when the number of available prediction types determined by the macroblock type is 2 or more. Once the macroblock or subblock prediction type is determined, prediction mode information according to the prediction type is extracted and decoded from the bitstream and then the block is reconstructed.

The prediction mode data is decoded by using the prediction mode information decoding method according to the aforementioned embodiment.

Hereinafter, a method of decoding the macroblock type will be described.

B.2.1.1. Macroblock Type Decoding Method

When the macroblock type is decoded like the macroblock within the inter picture, available macroblock types according to the picture type may be different as shown in Tables 6 to 8.

When the number of available macroblock types is 3 as shown in Table 6, the macroblock type can be indicated by decoding 1 bit or 2 bits. For example, a syntax having a 1 bit length indicating whether the macroblock type is the SKIP macroblock is decoded. Then, when the macroblock type is not the SKIP macroblock, 1 bit is further extracted and decoded from the bitstream to determine whether the macroblock type to be decoded is the mixed inter/intra macroblock or the inter macroblock.

When the number of available macroblock types is 4, the macroblock type can be indicated by decoding 1 bit, 2 bits, or 3 bits. For example, in Table 7, a syntax having a 1 bit length indicating whether the macroblock type is the SKIP macroblock, for example, skip_flag is decoded. Then, when the macroblock type is not the SKIP macroblock, 1 bit or 2 bits are further extracted and decoded and then the macroblock type is reconstructed. When the macroblock type, which is not the SKIP macroblock, is decoded by using Table 10, 1 bit is extracted and decoded from the bitstream. When a reconstructed code word is 1, the macroblock type is determined as the inter macroblock. When the reconstructed code word is 0, 1 bit is further extracted and decoded from the bitstream and then it is determined whether the macroblock type is the intra macroblock or the mixed inter/intra macroblock.

Alternatively, a macroblock type of a target macroblock to be currently decoded can be decoded by using neighboring macroblocks of the target macroblock to be currently decoded, for example, using macroblock types of an upper macroblock and a left macroblock of the target macroblock.

Alternatively, the macroblock type can be decoded by using a code word table promised between the encoder and the decoder.

When the number of available macroblock types is 5 as shown in Table 8, the macroblock type can be indicated by decoding 1 bit or 3 bits. For example, in Table 8, a syntax having a 1 bit length indicating whether the macroblock type is the SKIP macroblock, for example, skip_flag is decoded. Then, when the macroblock type is not the SKIP macroblock, the syntax indicating the macroblock type can be decoded by using a binary string shown in Table 11.

Alternatively, a macroblock type of a target macroblock to be currently decoded can be decoded by using neighboring macroblocks of the target macroblock to be currently decoded, for example, using macroblock types of an upper macroblock and a left macroblock of the target macroblock.

Alternatively, the macroblock type can be decoded by using a code word table promised between the encoder and the decoder.

Further, the variable-length decoding method of the syntax indicating the macroblock type may include various binary coding methods such as a unary code, a truncated unary code, an Exp-Golomb code, etc.

Further, the macroblock type can be arithmetic-decoded by using prediction type information of blocks.

Although two types of the syntaxes, which include the syntax (skip_flag) for indicating whether the macroblock type is the SKIP macroblock and the syntax (mb_type) for indicating macroblock types except for the SKIP macroblock type when the macroblock type is not the SKIP macroblock, are used herein to indicate the macroblock type, the macroblock type can be decoded by using one syntax or three or more syntaxes.

B.2.1.2. Prediction Type Decoding Method According to the Macroblock Type

When the number of available prediction types according to the macroblock type is 2 or more, prediction type information of each subblock within the macroblock is decoded. When the number of available prediction types of subblocks according to the macroblock types shown in Tables 6 to 8 is 2, a syntax having a 1 bit length indicating a prediction type of each subblock is decoded.

When the number available prediction types is 3, the prediction type can be decoded by using a syntax having a 1 bit or 2 bit length. For example, when the available prediction types are three types including the SKIP mode, the inter prediction, and the intra prediction, 1 bit indicating whether the prediction type is the SKIP mode is first decoded. When the prediction type is not the SKIP mode, 1 bit is further decoded to determine whether the prediction type is an inter-predicted subblock or an intra-predicted subblock. Alternatively, when the available prediction types are the Direct mode, the inter prediction, and the intra prediction, 1 bit indicating whether the prediction type is the Direct mode is decoded. When the prediction type is not the Direct mode, 1 bit indicating whether the prediction type is the intra prediction or the inter prediction may be further decoded.

When the three available prediction types are the SKIP mode, the Direct mode, and the inter prediction, 1 bit indicting whether the prediction type is the SKIP mode is first decoded. Then, when the prediction type is not the SKIP mode, 1 bit is further decoded to determine whether the prediction type is a Direct-predicted subblock or an inter-predicted subblock.

When the number of available prediction types is 4, the prediction type can be decoded using a syntax having a 1 bit length, a 2 bit length, or a 3 bit length. For example, when the four available prediction types are the SKIP mode, the Direct mode, the inter prediction, and the intra prediction, 1 bit indicating whether the prediction type is the SKIP mode is first decoded. Then, when the prediction type is not the SKIP mode, 1 bit is further decoded to determine whether the prediction type is the Direct mode. When the prediction type is neither the SKIP mode nor the Direct mode, 1 bit is decoded to determine whether the prediction type is an inter-predicted subblock or an intra-predicted subblock.

Alternatively, the prediction type can be decoded by using a syntax having a fixed length of 2 bits.

Alternatively, the prediction type can be decoded by using an arranged table.

In this event, a variable-length decoding method of the syntax indicating the prediction type may include various binary coding methods such as a unary code, a truncated unary code, an Exp-Golomb code, etc.

Further, in decoding a prediction type of a current block, the prediction type of the current block can be arithmetic-decoded using prediction type information of neighboring blocks.

Although only one type of the syntax indicating the prediction type is herein described, the prediction type can be decoded using a plurality of syntaxes. For example, three syntaxes, which include a SKIP_flag indicating whether the prediction type is the SKIP mode, a Direct_flag indicating whether the prediction type is the Direct mode, and a pred_type indicating an intra block or an inter block, can be used. Further, the syntaxes can be decoded using different methods, respectively.

Embodiment 3

An encoding and/or decoding Apparatus and Method Through the Selection of the Prediction Basic Unit.

Meanwhile, as described above, the prediction can be performed by unit of macroblocks or by selectively using the inter prediction or the intra prediction for each subblock within the macroblock, but the predictive encoding can be performed by selecting the prediction basic unit and using only one of the inter prediction and the intra prediction according to the prediction basic unit, or the predictive encoding can be performed by selectively using the inter prediction or the intra prediction.

Hereinafter, as another embodiment of the present disclosure, an example of an apparatus and a method for performing an encoding and a decoding by selecting the prediction basic unit within the macroblock and selecting the intra prediction or the inter prediction as the prediction basic unit will be described.

Here, the prediction basic unit refers to a size of a block which can select the inter prediction or the intra prediction within the macroblock. That is, the macroblock is the basic unit for an encoding and/or decoding process, and the prediction basic unit is the unit in which a prediction method can be selected. For example, for a macroblock of size 32×32, the prediction basic unit may be 32×32 or 16×16, or may be a block having a size smaller than 16×16. In this event, the intra prediction or the inter prediction can be selected only by unit of blocks having a size 16×16, and subblocks within the basic unit use the same prediction type.

C.1. Encoding Apparatus

Figure 8:
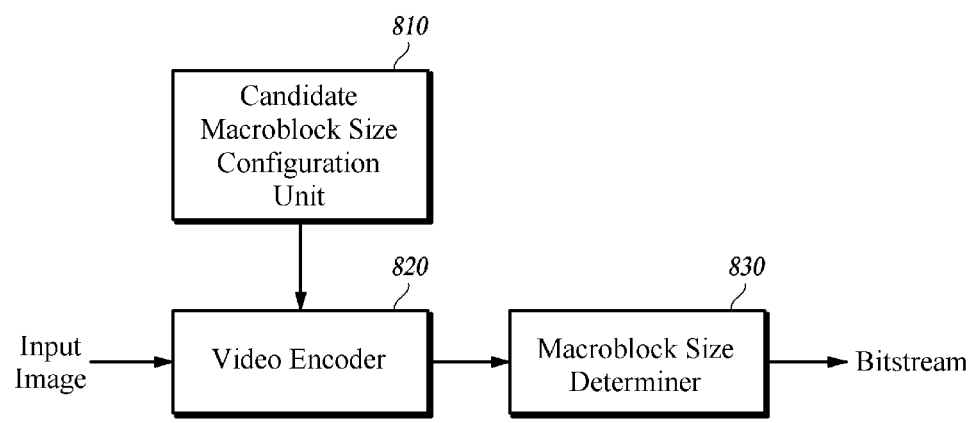
FIG. 8 is a schematic block diagram for illustrating a video encoding apparatus according to another embodiment of the present disclosure.

FIG. 8 is a schematic block diagram for illustrating a video encoding apparatus according to yet another embodiment of the present disclosure.

The video encoding apparatus 800 according to yet another embodiment of the present disclosure may include a candidate prediction basic unit configuration unit 810, a video encoder 820, and a prediction basic unit determiner 830.

The candidate prediction basic unit configuration unit 810 sets prediction basic unit candidates for a macroblock having an arbitrary size. The prediction basic unit candidates may be input by a user or determined according to image characteristics. Alternatively, the prediction basic unit candidates may be a set candidate group (e.g. 16×16, 32×32, etc.) input by other apparatuses. For example, when the prediction basic unit candidates are determined according to the image characteristics, the prediction basic unit candidates can be variously determined in consideration of a size and a ratio of a width and a height of an image, etc.

The video encoder 820 may be implemented as the video encoding apparatus 600 according to an embodiment of the present disclosure described with reference to FIG. 6.

However, the video encoding apparatus according to yet another embodiment of the present disclosure performs an encoding for each prediction basic unit candidate set by the candidate prediction basic unit configuration unit 810 by selectively using the inter prediction or the intra prediction in a corresponding prediction basic unit. The prediction basic unit within the macroblock may be transmitted to the decoder by encoding partition information by unit of macroblocks, or may be transmitted to a sequence header, a picture header, or a slice header only once. Thereafter, prediction type information is encoded in the prediction basic unit, not by unit of subblocks, and prediction mode information is encoded by unit of subblocks within the prediction basic unit.

The prediction type information and the prediction mode information according to the prediction type are encoded by using the aforementioned encoding method in the encoder of FIG. 6.

C.1.1. Prediction Basic Unit Determination Method

The prediction basic unit determiner 830 calculates encoding costs (i.e. encoding costs of image data encoded for each prediction basic unit candidate) generated when the video encoder 820 encodes an image for each prediction basic unit candidate and compares encoding costs of image data encoded for each prediction basic unit candidate, to determine an optimal prediction basic unit among prediction basic unit candidates. Here, the optimal prediction basic unit may be any prediction basic unit candidate selected from prediction basic unit candidates if the prediction basic unit candidate generates the lowest encoding cost when the image is encoded using the corresponding prediction basic unit candidate. However, in a case of using encoding costs, various optimal prediction basic unit candidates may be determined using the encoding costs.

Another method of determining the prediction basic unit is described (in the event where the prediction basic unit determiner is not used).

The video encoder 820 encodes macroblocks by using an available prediction type according to a picture type among the intra prediction mode and the inter prediction mode for each block, and compares encoding costs to determine an optimal prediction type and prediction mode for each block. Then, when all subblocks within the macroblock use the intra prediction mode or the inter prediction mode, a macroblock size is determined as the prediction basic unit. When there simultaneously exist both the intra prediction and the inter prediction as the prediction type of subblocks within the macroblock, a maximum size of a subblock in which the intra prediction is selected is set as the prediction basic unit.

Alternatively, the macroblock type is set to a value indicating the intra macroblock and encoded. When all subblocks within the macroblock use only the inter prediction, the macroblock type is set to a value indicating the inter macroblock and encoded. When there is a block using the intra prediction mode and the inter prediction mode within the macroblock, the macroblock type is set to a value indicating the intra/inter macroblock and encoded. Further, a maximum size of a subblock in which the intra prediction is selected may be set as the prediction basic unit.

Further, once the prediction basic unit is determined, the prediction basic unit determiner 830 generates image data encoded in a corresponding prediction basic unit as the bitstream and can transmit the bitstream to the decoder.

C.1.2. Basic Unit Encoding Method

The determined prediction basic unit can be encoded only once in the sequence header, the header of each picture, or the slice header, instead of by unit of macroblocks. In this event, partition information from a macroblock having an arbitrary size to the prediction basic unit may not be encoded.

C.1.2.1. Basic Unit Encoding Method 1

Hereinafter, various methods of encoding the selected prediction basic unit only once in the sequence header, the picture header, or the slice header according to the present disclosure will be described. First, a first method of encoding the prediction basic unit is described.

The prediction basic unit may be either transmitted or not by means of a flag (Set_predBlockSize_flag) indicating whether to transmit a prediction basic unit size to the sequence header, the header of each picture, or the slice header.

When the prediction basic unit size is not transmitted, an arbitrary size, for example, a size 16×16 may be used as the prediction basic unit, and the prediction basic unit may be encoded by encoding partition information in every macroblock.

When the prediction basic unit is designated, information on the prediction basic unit is transmitted. In this event, a prediction basic unit of an arbitrary size can be used by separately setting a horizontal size and a vertical size of the prediction basic unit.

Further, a specific value may be designated as the prediction basic unit, and a value indicating the number of times, by which the prediction basic unit is to be enlarged or reduced with respect to a predetermined size, may be transmitted.

In addition, the prediction basic unit size value may be represented using smaller bits through applying a log function to the prediction basic unit size value instead of directly encoding the prediction basic unit size value. For example, a value of $\log_2$ (selected prediction basic unit/X) (X is any positive integer, which is a multiple of 2) is encoded. When a value of X is 16, 0 is encoded if the selected prediction basic unit is 16×16, and 1 is encoded if the selected prediction basic unit is 32×32.

Further, magnifications of the horizontal size and the vertical size may be encoded, respectively.

Alternatively, the prediction basic unit may be an index value of a table promised between the encoder and the decoder.

In this event, the prediction basic unit may be encoded using various binary coding methods such as a unary code, a truncated unary code, and an exponential (Exp) Golomb code.

An example of a syntax according to the aforementioned first method of encoding the prediction basic unit is as follows.

```
Set_ predBlockSize _flag
if(Set_ predBlockSize _flag == 1)
{
predBlockSize
}
or
Set_ predBlockSize _flag
if(Set_ predBlockSize _flag == 1)
{
predBlockSize _Width
```

-continued

```
predBlockSize _height
}
```

Hereinafter, it is not described to separately set the horizontal size and the vertical size for the convenience of descriptions, but it is applicable to separately set the horizontal size and the vertical size. Further, although it is exemplified to encode data on the sequence header and the picture header, the data may be encoded on the slice header.

C.1.2.2. Basic Unit Encoding Method 2

Hereinafter, a second method of encoding the prediction basic unit is described.

According to the second method, a size M×N is set as the prediction basic unit, and a flag indicating whether to use a default prediction basic unit is encoded in every header of each picture. When the default prediction basic unit is not used, a selected prediction basic unit is encoded. Alternatively, a flag indicating whether to set the default prediction basic unit is encoded in the sequence header. When the default prediction basic unit is not set, a predetermined size, for example, a size 16×16 is used as the default prediction basic unit. When the default prediction basic unit is set, the default prediction basic unit may be encoded.

In a method of encoding default_predBlockSixe which is information indicating a default prediction basic unit size or a value of predBlockSize which is information indicating a current prediction basic unit size, an actual prediction basic unit size may be designated and a value indicating the number of times, by which the prediction basic unit is to be enlarged or reduced with respect to a predetermined size, may be transmitted. Alternatively, as described in the aforementioned first method, the macroblock size value can be represented using the smaller number of bits through applying a log function to the prediction basic unit size value instead of directly encoding the prediction basic unit size value.

Further, magnifications of the horizontal size and the vertical size may be encoded, respectively.

Alternatively, the prediction basic unit may be an index value of a table promised between the encoder and the decoder.

In this event, the prediction basic unit may be encoded using various binary coding methods such as a unary code, a truncated unary code, and an exponential (Exp) Golomb code.

An example of a syntax according to the aforementioned second method of encoding the prediction basic unit is as follows.

Sequence Header:

```
Set_default predBlockSize _Flag
if(Set_ default predBlockSize _Flag == 1)
{
defalt_ predBlockSize
}
Picture header:
use_defalt_ predBlockSize _flag
if(use_defalt_ predBlockSize e_flag == 0)
{
predBlockSize
}
```

C.1.2.3. Basic Unit Encoding Method 3

Hereinafter, a third method of encoding the prediction basic unit is described.

According to the third method, after a flag indicating whether to use the default prediction basic unit and a prediction basic unit selected when the default prediction basic unit is not used are encoded in a first picture, a flag indicating whether to use a prediction basic unit of a previous picture and a prediction basic unit of a current picture when the prediction basic unit of the previous picture is not used may be encoded from a second picture.

In a method of encoding a value of predBlockSize which is information indicating a current prediction basic unit size, an actual prediction basic unit size may be designated and a value indicating the number of times, by which the prediction basic unit is to be enlarged or reduced with respect to a predetermined size, may be transmitted. Alternatively, as described in the aforementioned first method, the macroblock size value can be represented using the smaller number of bits through applying a log function to the prediction basic unit size value instead of directly encoding the prediction basic unit size value.

Further, magnifications of the horizontal size and the vertical size may be encoded, respectively.

Alternatively, the prediction basic unit may be an index value of a table promised between the encoder and the decoder.

In this event, the prediction basic unit may be encoded using various binary coding methods such as a unary code, a truncated unary code, and an exponential (Exp) Golomb code.

An example of a syntax according to the aforementioned second method of encoding the prediction basic unit is as follows.

```
Picture header of first picture
use_defalt_ predBlockSize _flag
if(use_defalt_ predBlockSize _flag == 0)
{
predBlockSize
}
From second picture
use_prevPic_ predBlockSize _flag
if(use_prevPic_ predBlockSize e_flag == 0)
{
predBlockSize
}
```

C.1.3. (Encoding) Method

Figure 9:
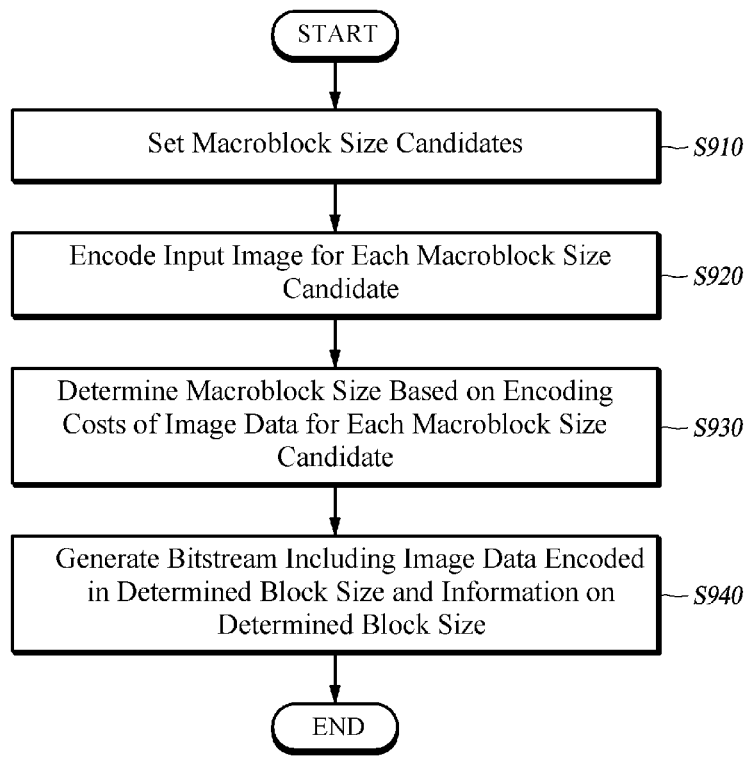
FIG. 9 is a flowchart for illustrating a video encoding method according to another embodiment of the present disclosure.

FIG. 9 is a flowchart for illustrating an example of a video encoding method according to yet another embodiment of the present disclosure.

The video encoding apparatus sets prediction basic unit candidates, encodes an input image for each prediction basic unit candidate, determines a prediction basic unit according to an encoding cost of image data for each prediction basic unit candidate, and generates a bitstream including image data encoded selectively using the inter prediction or the intra prediction for each subblock of the macroblock according to the determined prediction basic unit and information on the determined prediction basic unit. Since it has been described through FIG. 8 that the video encoding apparatus sets prediction basic unit candidates, encodes an image for each prediction basic unit candidate, and determines the prediction basic unit according to the encoding cost of image data encoded for each prediction basic unit, its detailed description is omitted.

C.2. Decoding Apparatus

FIG. 10 is a schematic block diagram for illustrating an implementation of a video decoding apparatus according to yet another embodiment of the present disclosure.

An example of the video decoding apparatus according to yet another embodiment of the present disclosure may be constructed equally or similarly to the video decoding apparatus 700 according to an embodiment of the present disclosure.

However, the video decoding apparatus according to yet another embodiment of the present disclosure may include a prediction basic unit configuration unit and a video decoder.

An example of the video decoding apparatus according to yet another embodiment of the present disclosure extracts not only encoded image data but also information on the prediction basic unit for selectively using the inter prediction or the intra prediction for a macroblock having an arbitrary size from the bitstream, a reconstructed image is generated by decoding image data encoded selectively using the inter prediction or the intra prediction for respective subblocks within the macroblock smaller than the prediction basic unit (or prediction basic unit identified by decoding information on the extracted prediction basic unit if necessary) size identified by information on the extracted prediction basic unit.

The prediction basic unit configuration unit extracts prediction basic unit information from the bitstream to set the prediction basic unit within the macroblock. When it is arranged with the encoder that the prediction basic unit information is included in the bitstream only once, an image can be reconstructed by decoding the prediction basic unit information in the bitstream for an entire image only once and using the extracted prediction basic unit for an entire image decoding. When it is arranged that the prediction basic unit is encoded/decoded in every picture, the prediction basic unit information is extracted from the bitstream in every picture, and an image can be reconstructed by using different prediction basic units for each picture. Further, according to another embodiment of the present disclosure, the information is extracted in every picture, slice, or macroblock layer and an image can be reconstructed by using the selected prediction basic unit.

Once the prediction basic unit is set in the prediction basic unit configuration unit, the decoder extracts prediction type information from the bitstream in the prediction basic unit and extracts and decodes prediction mode information for each subblock according to the prediction type, to reconstruct the macroblock.

C.2.1. Prediction Basic Unit Decoding Method

Hereinafter, various methods of decoding the selected prediction basic unit according to the present disclosure will be described.

C.2.1.1. Prediction Basic Unit Decoding Method 1

First, a decoding method according to the first method of encoding the prediction basic unit is described.

When a flag (Set_predBlockSize_flag) indicating whether to transmit information on the prediction basic unit size is included, the flag (Set_predBlockSize_flag) indicating whether to transmit the information on the prediction basic unit size is entropy-decoded in an arranged position such as the sequence header, the header of each picture, the slice header, etc. When the decoded flag has a value indicating that the prediction basic unit size is not transmitted, a prediction basic unit having a predetermined size arranged with the encoder, for example, a 16×16 block is used as the prediction basic unit.

When the decoded prediction basic unit size designation flag (Set_predBlockSize_flag) indicates that the prediction basic unit size is designated, the macroblock size is entropy-decoded and extracted through a method promised with the encoder among various entropy decoding methods such as a unary code, a truncated unary-code, exponential (Exp)-golomb code, etc.

When a horizontal size and a vertical size of the prediction basic unit are separately set and then transmitted, the horizontal size and the vertical size may be obtained by entropy-decoding each of the sizes. Alternatively, if a square prediction basic unit is used, only information indicating one side of the square prediction basic unit may be entropy-decoded.

A decoded value may be designated as the actual prediction basic unit size, and a value indicating the number of times, by which a prediction basic unit is to be enlarged or reduced from a predetermined size, may be transmitted. Further, when the encoder encodes a value generated by applying a log function to the prediction basic unit size value, the prediction basic unit size may be set by applying an exponential function to the entropy-decoded value. For example, when the encoder encodes y, which is a value of $\log_2$ (PredBlockSize selected in the encoder/X) (X is any positive integer, which is a multiple of 2), the decoder entropy-decodes y and can obtain the prediction basic unit size selected in the encoder by multiplying $2^y$ and X. Here, X corresponds to a value promised between the encoder and the decoder or a value extracted from the bitstream before a prediction basic unit size decoding. When a value of X is 8, the prediction basic unit size is set to 8×8 if a value of decoded y is "0", and the prediction basic unit size is set to 16×16 if the value of decoded y is "1".

Further, when magnifications of the horizontal size and the vertical size are separately decoded in the encoder, the prediction basic unit size may be obtained by separately entropy-decoding the magnifications of the horizontal size and the vertical size.

In addition, when an index value of a table promised between the encoder and the decoder is encoded, the prediction basic unit size may be obtained by using a decoded value as the index value of the table.

In this event, the prediction basic unit size to be transmitted may be decoded using various binary coding methods such as a unary code, a truncated unary code, and an exponential (Exp) Golomb code.

Hereinafter, it is not described to separately decode and extract the horizontal size and the vertical size for the convenience of descriptions, but it is applicable to separately extract the horizontal size and the vertical size. Further, although it is exemplified to decode data on a sequence header and a picture header, the prediction basic unit size may be decoded on the slice header or the macroblock header when the encoder encodes the prediction basic unit size in the slice header.

C.2.1.2. Prediction Basic Unit Decoding Method 2

Hereinafter, a decoding method according to the second method of encoding the prediction basic unit is described.

According to the second method, a size M×N arranged with the encoder is set as the reference prediction basic unit size, and a flag indicating whether to use the reference prediction basic unit size is entropy-decoded from a header of each picture, a slice header, and a macroblock header. When a value of the decoded flag indicates that the reference prediction basic unit size is not used, information related to the prediction basic unit is extracted by entropy-decoding prediction basic unit size information, and the prediction basic unit size is set. A case where the value of the decoded flag indicates that the reference prediction basic unit size is used means that the prediction basic unit size information is not included in the bitstream, so that a preset reference prediction basic unit size is set as the prediction basic unit size and a series of decoding processes are performed.

When the reference prediction basic unit size is included in the sequence header and transmitted to the decoder from the encoder, the reference prediction basic unit size may be extracted from an arranged position such as the sequence header, etc. within the bitstream. Here, the reference prediction basic unit size or the current prediction basic unit size is allocated an entropy-decoded value, and the prediction basic unit size may be obtained by scaling (enlarging or reducing) a predetermined size by the entropy-decoded value. Alternatively, as described in the aforementioned first decoding method, when the encoder encodes a value generated by applying a log function to the prediction basic unit size value, the prediction basic unit size value may be obtained by using an exponential function.

Further, when the encoder separately decodes magnifications of the horizontal size and the vertical size, the prediction basic unit size may be obtained by separately entropy-decoding the magnifications of the horizontal size and the vertical size.

In addition, when an index value of a table promised between the encoder and the decoder is encoded, the prediction basic unit size may be obtained by using a decoded value as the index value of the table.

In this event, the prediction basic unit size to be transmitted may be decoded using various binary coding methods such as a unary code, a truncated unary code, and an exponential (Exp) Golomb code.

C.2.1.3. Prediction Basic Unit Decoding Method 3

Hereinafter, a decoding method according to the third method of encoding the prediction basic unit is described.

According to the third method, after a flag indicating whether to use the reference prediction basic unit size and prediction basic unit size information when the reference prediction basic unit size is not used are entropy-decoded in a first picture, a prediction basic unit size required for a first picture decoding is obtained by using the decoded prediction basic unit size information.

When the flag indicating whether to use the reference prediction basic unit size means that the reference prediction basic unit size is used, the prediction basic unit size is set equally to the reference prediction basic unit size and then the first picture is decoded.

From a second picture, after a flag indicating whether to use a prediction basic unit size of a previous picture as the current prediction basic unit size is decoded, prediction basic unit size information for a current picture decoding is decoded when the prediction basic unit size of the previous picture is not used. When the prediction basic unit size of the previous picture is used for a current picture decoding, a prediction basic unit size is set to the same size as the prediction basic unit size of the previous picture and the second picture is decoded.

In a method of decoding PredBlockSize, which is information indicating the prediction basic unit size of the current picture, an entropy-decoded value can be used as the prediction basic unit size and the prediction basic unit size can be obtained through an enlargement or a reduction from a predetermined size by using the entropy-decoded value as an enlarging ratio or a reducing ratio. Alternatively, as described in the aforementioned first decoding method, when the encoder encodes a value generated by applying a log function to the prediction basic unit size value, the prediction basic unit size value may be obtained using an exponential function.

Further, when magnifications of the horizontal size and the vertical size are separately decoded in the encoder, the reference prediction basic unit size may be obtained by separately entropy-decoding the magnifications of the horizontal size and the vertical size.

In addition, when an index value of a table promised between the encoder and the decoder is encoded, the prediction basic unit size may be obtained by using a decoded value as the index value of the table.

In this event, the reference prediction basic unit size may be decoded using various binary coding methods such as a unary code, a truncated unary code, and an exponential (Exp) Golomb code.

According to various embodiments of the present disclosure as described above, a high resolution image is able to be efficiently encoded and decoded by using various prediction mode combinations such as an intra prediction or an inter prediction for subblocks within a macroblock through the determination of a basic prediction unit based on image characteristics. Further, prediction information and partition information of the macroblock is able to be efficiently encoded and decoded by using the basic prediction unit.

In the description above, although all of the components of the embodiments of the present disclosure have been explained as assembled or operatively connected as a unit, the present disclosure is not intended to limit itself to such embodiments. Rather, within the objective scope of the claimed invention, the respective components is able to be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program is easily deduced by a person skilled in the art. The computer program may be stored in non-transitory computer readable recording medium, which in operation can realize some embodiments of the present disclosure. Examples of the non-transitory computer readable recording medium include magnetic recording media, such as a hard disk, a floppy disk, and a magnetic tape, and optical recording media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person of ordinary skill in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those of ordinary skill in the art will appreciate that various modifications, additions and substitutions are possible, without the spirit and scope of the claimed invention. Specific terms used in this disclosure and drawings are used for illustrative purposes and not to be considered as limitations of the present disclosure. Therefore, exemplary embodiments of the present disclosure have not been described for limiting purposes. Accordingly, the scope of the claimed invention is not to be limited by the above embodiments but by the claims and the equivalents thereof.

What is claimed is:

1. A video decoding apparatus for reconstructing residual signals of a current block to be decoded by using a tree structure, the apparatus comprising:
 a decoder configured to
  decode, from a bitstream, prediction type information on the current block to be decoded, and
  divide, by the tree structure, the current block into one or more subblocks of which information on residual signals is to be reconstructed, by decoding, from the bitstream, a partition flag which indicates whether a block corresponding thereto is divided into blocks of a lower layer in the tree structure, wherein blocks which are not further divided are identified as the subblocks of which information on the residual signals is to be reconstructed; and
 a reconstructor configured to reconstruct information on the residual signals of each of the subblocks from the bitstream,
 wherein, when a block of a first layer in the tree structure is divided into a plurality of blocks of a second layer which is a lower layer of the first layer, the decoder is configured to decode the partition flag for each of the blocks of the second layer in a predetermined order, the predetermined order being an order of an upper left block, an upper right block, a lower left block and a lower right block, and
 wherein, when a block among the blocks of the second layer is further divided into a plurality of blocks of a third layer which is a lower layer of the second layer, the decoder is configured to decode the partition flag for each of the blocks of the third layer in the predetermined order, before decoding the partition flag for a next block of the second layer in the predetermined order.

2. The video decoding apparatus of claim 1, wherein, when the partition flag indicates that a block is divided into blocks of a lower layer, the block is divided into four equal-sized blocks of the lower layer.

3. The video decoding apparatus of claim 1, wherein the decoder does not decode, from the bitstream, the partition flag for a block having a size identical to a minimum block size.

4. The video decoding apparatus of claim 1, wherein a size of the current block includes 16×16, 32×32 and 64×64 pixels.

5. The video decoding apparatus of claim 1, wherein a size of each of the subblocks is variably determined based on a size of the current block and the partition flag.

6. The video decoding apparatus of claim 1, wherein the prediction type information indicates whether the current block is inter-predicted or intra-predicted.

7. The video decoding apparatus of claim 1, wherein the decoder decode the prediction type information by
 decoding, from the bitstream, a first information indicating whether all the subblocks in the current block are predicted using the same prediction type, and
 decoding, from the bitstream, a second information indicating whether each subblock is inter-predicted or intra-predicted, when the first information does not indicate that all the subblocks in the current block are predicted using the same prediction type.

8. The video decoding apparatus of claim 1, wherein the reconstructor is configured to
   reconstruct, from the bitstream, coded block information indicating whether or not a subblock has at least one non-zero transform coefficient; and
   reconstruct transform coefficients of the subblock from the bitstream when the coded block information indicates that the subblock has at least one non-zero transform coefficient, and then inversely quantize and inversely transform the reconstructed transform coefficients.

9. The video decoding apparatus of claim 1, wherein the decoder starts to decode the partition flag from the current block on which the prediction type information is decoded.

\* \* \* \* \*